(12) United States Patent
Senarath et al.

(10) Patent No.: US 10,159,022 B2
(45) Date of Patent: Dec. 18, 2018

(54) METHODS AND SYSTEMS FOR ADMISSION CONTROL AND RESOURCE AVAILABILITY PREDICTION CONSIDERING USER EQUIPMENT (UE) MOBILITY

(71) Applicant: Huawei Technologies Co., Ltd., Shenzhen (CN)

(72) Inventors: Nimal Gamini Senarath, Ottawa (CA); Ho Ting Cheng, Stittsville (CA); Hang Zhang, Nepean (CA); Alex Stephenne, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 15/208,471

(22) Filed: Jul. 12, 2016

(65) Prior Publication Data
US 2016/0366623 A1 Dec. 15, 2016

Related U.S. Application Data

(63) Continuation of application No. 14/106,531, filed on Dec. 13, 2013, now Pat. No. 9,392,508.
(Continued)

(51) Int. Cl.
*H04W 36/00* (2009.01)
(52) U.S. Cl.
CPC ... *H04W 36/0083* (2013.01); *H04W 36/0072* (2013.01)
(58) Field of Classification Search
CPC .. H04M 15/00; H04M 15/80; H04M 2215/32; H04W 4/24; H04L 41/0896
See application file for complete search history.

(56) References Cited

U.S. PATENT DOCUMENTS

| | | | |
|---|---|---|---|
| 5,572,221 A | 11/1996 | Marlevi et al. | |
| 5,825,759 A | 10/1998 | Liu | |
| (Continued) | | | |

FOREIGN PATENT DOCUMENTS

| | | |
|---|---|---|
| CA | 2350449 A1 | 12/2002 |
| CN | 1196153 A | 10/1998 |
| (Continued) | | |

OTHER PUBLICATIONS

Wikipedia, "Asynchronous Transfer Mode" http://en.wikipedia.org/wiki/Asynchronous_Transfer_Mode, retrieved May 6, 2014.
(Continued)

*Primary Examiner* — Chandrahas B Patel
(74) *Attorney, Agent, or Firm* — Slater Matsil, LLP

(57) ABSTRACT

Predicting mobile station migration between geographical locations of a wireless network can be achieved using a migration probability database. The database can be generated based on statistical information relating to the wireless network, such as historical migration patterns and associated mobility information (e.g., velocities, bin location, etc.). The migration probability database consolidates the statistical information into mobility prediction functions for estimating migration probabilities/trajectories based on dynamically reported mobility parameters. By example, mobility prediction functions can compute a likelihood that a mobile station will migrate between geographic regions based on a velocity of the mobile station. Accurate mobility prediction may improve resource provisioning efficiency during admission control and path selection, and can also be used to dynamically adjust handover margins.

22 Claims, 31 Drawing Sheets

Related U.S. Application Data

(60) Provisional application No. 61/736,965, filed on Dec. 13, 2012, provisional application No. 61/737,579, filed on Dec. 14, 2012.

(56) References Cited

U.S. PATENT DOCUMENTS

| | | |
|---|---|---|
| 6,351,642 B1 | 2/2002 | Corbett et al. |
| 6,411,946 B1 | 6/2002 | Chaudhuri |
| 6,697,333 B1 | 2/2004 | Bawa et al. |
| 6,904,017 B1 | 6/2005 | Meempat et al. |
| 6,934,249 B1 | 8/2005 | Bertin et al. |
| 8,108,554 B1 | 1/2012 | Masters |
| 8,369,220 B1 | 2/2013 | Khanna et al. |
| 8,849,183 B2 | 9/2014 | Edge et al. |
| 9,077,553 B2 * | 7/2015 | Paredes ............... H04L 12/2417 |
| 2003/0016624 A1 | 1/2003 | Bare |
| 2004/0205237 A1 | 10/2004 | Doshi et al. |
| 2005/0169183 A1 | 8/2005 | Lakkakorpi et al. |
| 2006/0028991 A1 | 2/2006 | Tan et al. |
| 2006/0083205 A1 | 4/2006 | Buddhikot et al. |
| 2006/0178158 A1 | 8/2006 | Muller |
| 2007/0110034 A1 | 5/2007 | Bennett |
| 2007/0110035 A1 | 5/2007 | Bennett |
| 2008/0043709 A1 | 2/2008 | Zhou et al. |
| 2008/0267088 A1 | 10/2008 | Dunbar et al. |
| 2009/0047970 A1 | 2/2009 | Kim et al. |
| 2009/0088156 A1 | 4/2009 | Aaron |
| 2009/0141694 A1 | 6/2009 | Shi |
| 2009/0191858 A1 | 7/2009 | Calisti et al. |
| 2009/0232089 A1 | 9/2009 | Lott |
| 2010/0183025 A1 | 7/2010 | Stephens et al. |
| 2010/0238835 A1 | 9/2010 | Lundgren et al. |
| 2011/0090853 A1 | 4/2011 | Chandramouli et al. |
| 2011/0096675 A1 | 4/2011 | Li et al. |
| 2011/0122812 A1 | 5/2011 | Jeong et al. |
| 2011/0125921 A1 | 5/2011 | Karenos et al. |
| 2011/0205901 A1 | 8/2011 | Imai |
| 2011/0243024 A1 | 10/2011 | Osterling et al. |
| 2011/0244899 A1 | 10/2011 | Li et al. |
| 2012/0057456 A1 | 3/2012 | Bogatin et al. |
| 2012/0087276 A1 | 4/2012 | Huang et al. |
| 2012/0115467 A1 | 5/2012 | Conte et al. |
| 2012/0270556 A1 | 10/2012 | Yin et al. |
| 2012/0289236 A1 | 11/2012 | Xu et al. |
| 2013/0088983 A1 | 4/2013 | Pragada et al. |
| 2013/0281007 A1 | 10/2013 | Edge et al. |
| 2013/0336118 A1 | 12/2013 | Shaw et al. |
| 2014/0086065 A1 | 3/2014 | DeCusatis et al. |
| 2014/0140210 A1 | 5/2014 | Liu et al. |
| 2014/0162626 A1 | 6/2014 | Cui et al. |
| 2014/0219104 A1 | 8/2014 | Senarath et al. |
| 2014/0185581 A1 | 9/2014 | Senarath et al. |
| 2014/0269332 A1 | 9/2014 | Senarath et al. |
| 2015/0032495 A1 | 1/2015 | Senarath et al. |

FOREIGN PATENT DOCUMENTS

| | | |
|---|---|---|
| CN | 1336090 A | 2/2002 |
| CN | 101686467 A | 3/2010 |
| CN | 101821972 A | 9/2010 |
| EP | 1302783 A1 | 4/2003 |
| EP | 1347603 A1 | 9/2003 |
| EP | 2237495 A1 | 10/2010 |
| WO | 0036863 A1 | 6/2000 |
| WO | 2009004661 A2 | 1/2009 |
| WO | 2012059130 A1 | 5/2012 |

OTHER PUBLICATIONS

Baldo, O. B. et al., "Decentralised Call Admission Control for Wireless ATM," in IEE Proceedings—Communications, vol. 146, No. 6, Dec. 1999, pp. 366-371.

Choi, S. et al., "Predictive and Adaptive Bandwidth Reservation for Hand-offs in QoS-sensitive cellular networks," Proceedings of the ACM SIGCOMM '98 Conference on Applications, Technologies, Architectures, and Protocols for Computer Communication, (SIGCOMM '98), Martha Steenstrup (Ed.). ACM, New York, NY, USA, pp. 155-166.

Chowdhury, M., et al., "Call Admission Control Based on Adaptive Bandwidth Allocation for Wireless Networks," Journal of Communications and Networks, vol. 15, No. 1, Feb. 2013, pp. 15-24.

Falkner, M.,"Minimum Cost Traffic Shaping: A User's Perspective on Connection Admission Control." Department of Systems and Computer Engineering, Carleton University, Ottawa, Ontario, Canada 1999, pp. 1-6.

Fitzpatrick, J., "ECHO: A Quality of Service Based Endpoint Centric Handover Scheme for VoIP," IEEE Wireless Communications and Networking Conference, Mar. 31, 2008-Apr. 3, 2008, pp. 2777-2782.

Ge, Y., "Quality of Service Routing in Ad-Hoc Networks Using OLSR." IEEE Proceedings of the 36th Hawaii International Conference on System Sciences, 2003, pp. 1-9.

Notification of Transmittal of the International Search Report and the Written Opinion of the International Searching Authority, or the Declaration received in Application No. PCT/US2013/075480, dated Apr. 4, 2014, 12 pages.

International Search Report and Written Opinion received in International Application No. PCT/CN2014/081863 dated Oct. 14, 2014, 15 pages.

International Search Report and Written Opinion receivedin Application No. PCT/CN13/75173 dated Apr. 22, 2014, 11 pages.

Wikipedia, "Least-Cost Routing", Retrieved Jun. 29, 2015 from https://en.wikipedia.org/wiki/Least-cost_routing, 4 pages.

Levine, D. A., "A Resource Estimation and Call Admission Algorithm for Wireless Multimedia Networks Using the Shadow Cluster Concept," IEEE/ACM Transactions on Networking, vol. 5, No. 1, Feb. 1997, pp. 1-12.

Wikipedia, "Open Shortest Path First" http://en.wikipedia.org/wiki/Open_Shortest_Path_First, retrieved May 6, 2014.

Peha, J., "Sharing Spectrum Through Spectrum Policy Reform and Cognitive Radio", Proceedings of the IEEE, vol. 97, No. 4, Apr. 2009, pp. 708-719.

Rossi, M., "Integrated Cost-Based MAC and Routing Techniques for Hop Count Forwarding in Wireless Sensor Networks." IEEE Transactions on Mobile Computing, Apr. 2007 vol. 6, No. 4, pp. 434-448.

Shaaban, Y., "Cost-based admission control for Internet Commerce QoS enhancement." Electronic Commerce Research and Applications,vol. 8, Issue 3, May-Jun. 2009, pp. 142-159.

Vasu, K., "QoS Aware Fuzzy Rule Based Vertical Handoff Decision Algorithm for Wireless Heterogeneous Networks," 2011 National Conference on Communications (NCC), Jan. 28-30, 2011, 5 pages.

Yang, X., et al. "Enhanced Position Assisted Soft Handover Algorithm for UTRA," IEEE VTS 54th Vehicular Technology Conference, vol. 2, Oct. 2001, pp. 567-571.

Ye, F. "A Scalable Solution to Minimum Cost Forwarding in Large Sensor Networks." UCLA Computer Science Department, Los Angeles, CA pp. 304-309.

* cited by examiner

| TRAFFIC | MOBILITY | TRADITIONAL ALLOCATION TECHNIQUES | EMBODIMENT ALLOCATION TECHNIQUES |
|---|---|---|---|
| ASSUMED KNOWN; CHARACTERIZED BY ON-OFF MODELS | FIXED | EFFECTIVE BANDWIDTH; IGNORE TRAFFIC MULTIPLEXING GAIN | EFFECTIVE BANDWIDTH; CONSIDER TRAFFIC MULTIPLEXING GAIN |
| | PREDICTABLE (>50% ACCURACY) | SHADOW CLUSTERING, OR PATH MATCHING | COMBINING SHADOW CLUSTERING AND PATH MATCHING |
| | NON-PREDICTABLE (SLOW SPEED) | STATIC RESOURCE RESERVATION | OPTIMIZED RESOURCE RESERVATION |
| | NON-PREDICTABLE (HIGH SPEED) | MACRO-FIRST; STATIC RESOURCE RESERVATION | MACRO-FIRST WITH OPTIMIZED RESOURCE RESERVATION |

FIG. 29

METHODS AND SYSTEMS FOR ADMISSION CONTROL AND RESOURCE AVAILABILITY PREDICTION CONSIDERING USER EQUIPMENT (UE) MOBILITY

This patent application is a continuation of U.S. Non-Provisional application Ser. No. 14/106,531 filed on Dec. 13, 2013 and entitled "Methods and Systems for Admission Control and Resource Availability Prediction Considering User Equipment (UE) Mobility," which claims priority to U.S. Provisional Application No. 61/736,965, filed on Dec. 13, 2012 and entitled "Method and System for Admission Control by a Control Entity Party Considering Mobility," and U.S. Provisional Application No. 61/737,579, filed on Dec. 14, 2012 and entitled "Methods and Systems for Resource Availability Prediction via Effective Bandwidth-Based Traffic Characterization Considering UE Mobility and Wireless Channel Impairment," all of which are incorporated by reference herein as if reproduced in their entireties.

TECHNICAL FIELD

The present invention relates generally to wireless communications, and in particular embodiments, to methods and systems for admission control and resource availability prediction considering user equipment (UE) mobility.

BACKGROUND

In conventional wireless networks, radio resource allocation decisions react to (and therefore lag) real-time changes in the network environment, such as fluctuations in traffic density and resource utilization. For example, handovers from source access points (APs) to target APs may be initiated only after a mobile station migrates into the service area of the target AP. This latency may lead to in-efficient resource utilization (e.g., sub-optimal admission and/or resource allocation decisions) in dynamic networks. For example, networks may need to maintain larger bandwidth reserves (e.g., handover margins, etc.) to allow for large fluctuations in traffic and/or throughput demand. Accordingly, mechanisms for more efficient resource allocation are desired.

SUMMARY OF THE INVENTION

Technical advantages are generally achieved, by embodiments of this disclosure which describe methods and systems for admission control and resource availability prediction considering user equipment (UE) mobility.

In accordance with an embodiment, a method for mobility prediction is provided. In this example, the method includes gathering statistical information for mobile station migration in a wireless network, and building a migration probability table for the wireless network in accordance with the statistical information. The wireless network includes at least a first geographic region and a second geographic region. The migration probability table specifies probabilities that mobile stations will migrate from the first geographic region to the second geographic region over one or more fixed periods. The probabilities are specified in accordance with mobility parameters of the mobile stations, and the migration probability table is configured to be used for resource provisioning in the wireless network. An apparatus for performing this method is also provided.

In accordance with another embodiment, a method for projecting handovers in a wireless network is provided. In this example, the method includes obtaining mobility parameters corresponding to a mobile station during an initial time interval, and estimating migration probability information in accordance with the mobility parameter and a migration probability table. The mobile station is located outside of a coverage area of the wireless network during the initial time interval. The migration probability information specifies a likelihood that the mobile station will migrate into the coverage area during a sequence of one or more time intervals following the initial time interval. The method further includes adjusting a handover margin for the coverage area in accordance with the migration probability information. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 29 illustrates a table showing new allocation techniques for different traffic and prediction scenarios;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are techniques for predicting mobile station migration based on mobile station mobility parameters. More specifically, aspects of this disclosure construct migration probability databases based on statistical information relating to a wireless network. The statistical information may include historical traffic information, such as mobile station migration patterns and associated mobility information (e.g., velocities, bin location, etc.). The migration probability database consolidates the statistical information into mobility prediction functions for estimating migration probabilities/trajectories based on dynamically reported mobility parameters. By way of example, mobility prediction functions may compute a likelihood that a mobile station will migrate between geographic regions based on a velocity of the mobile station. Accurate mobility prediction may improve resource provisioning efficiency. For example, accurate mobility prediction can be used during admission control to estimate resource availability. As another example, accurate mobility prediction may allow handover margins to be dynamically adjusted with increased precision, thereby increasing the pool of available resources and decreasing blocked/dropped calls. Additionally, mobility prediction can be used to estimate spectral efficiency when network loading information is available. These and other aspects are explained in greater detail below.

Figure 1:
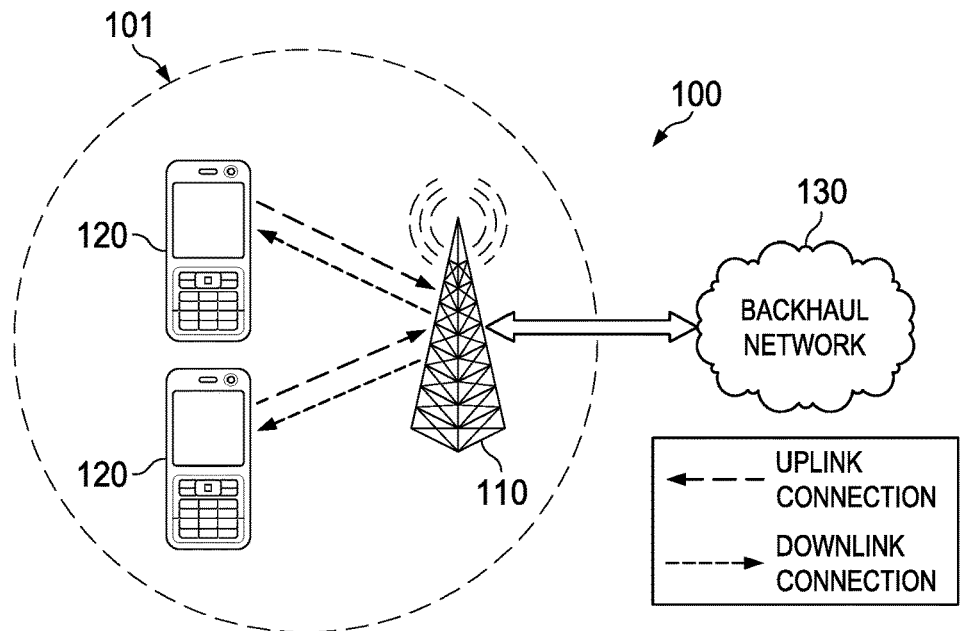
FIG. 1 illustrates a diagram of an embodiment communications network.

FIG. 1 illustrates a network 100 for communicating data. The network 100 comprises an access point (AP) no having a coverage area 101, a plurality of stations (STAs) 120, and a backhaul network 130. The AP no may comprise any component capable of providing wireless access by, inter alia, establishing uplink (dashed line) and/or downlink (dotted line) connections with the STAs 120, such as a base station, an enhanced base station (eNB), a femtocell, and other wirelessly enabled devices. The STAs 120 may comprise any component capable of establishing a wireless connection with the AP 110. The backhaul network 130 may be any component or collection of components that allow data to be exchanged between the AP no and a remote end (not shown). In some embodiments, the network 100 may comprise various other wireless devices, such as relays, femtocells, etc.

Figure 2A:
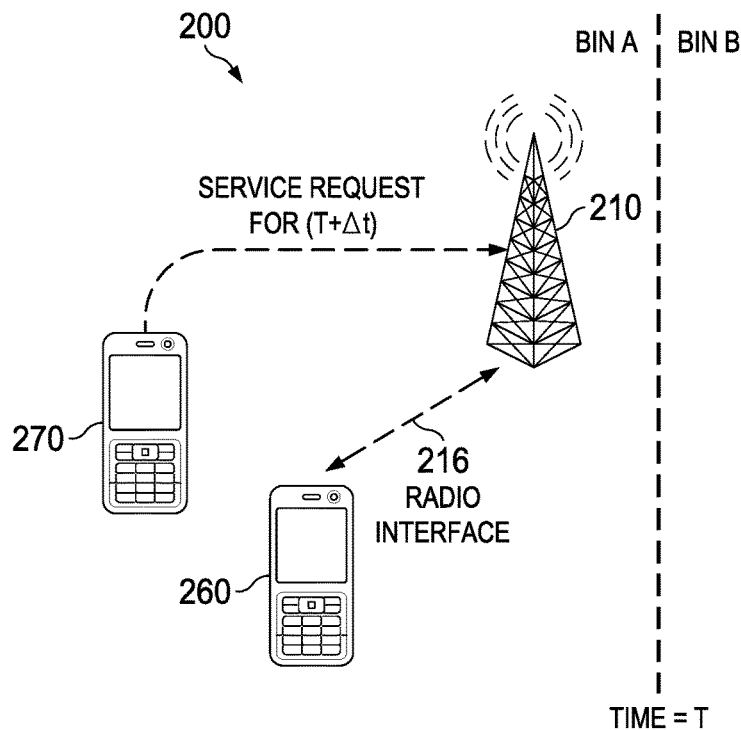
FIGS. 2A-2B illustrate diagrams depicting a mobile station migration scenario.
Figure 2B:
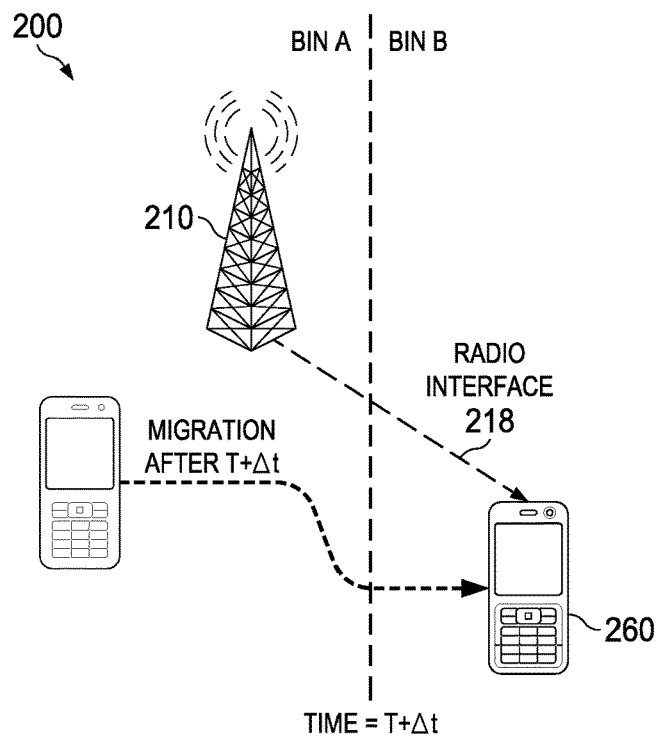

In some situations, predicting future resource utilization/availability may facilitate more efficient resource provisioning and/or allocation decisions. FIGS. 2A-2B illustrates an exemplary situation showing how user admission and/or resource allocation can benefit from accurate prediction of resource utilization/availability in a wireless network 200. As shown, the network 200 includes an access point (AP) 210 whose coverage area is split into two geographical areas, namely BIN A and BIN B. FIG. 2A illustrates the network 200 at a first instance in time (T), during which the AP 210 is providing wireless access to a mobile station 260 located in BINA via a radio interface 216. During that same time instance, the AP 210 receives a service request from a mobile station 270 requesting wireless service in the BIN A at a second instance in time (T+Δt). Conventionally, the AP 210 would make any admission/resource-allocation decisions under the assumption that the mobile station 260 will continue to access the network 200 from BIN A at the second instance in time. For example, the AP 210 may decide that servicing both of the mobile stations 260, 270 would overload BIN A, and consequently may decide to reject the service request from mobile station 270. However, as shown in FIG. 2B, the mobile station 260 may migrate to from BIN A to BIN B during an interim period (Δt) between the first instance in time (T) and the second instance in time (T+Δt). Alternatively, the mobile station 260 may conclude, prior to the second instance in time (T+Δt), that the mobile station 260 may stop accessing the wireless network 200 altogether (or at least, in a reduced capacity, e.g., idle paging, etc.). In either case, the AP's 210 conventional assumption may prove inaccurate, and the AP's 210 decision to reject the service request of the mobile station 270 may have undesirable affects, e.g., reduce the overall spectral efficiency of the network 200, etc.

Aspects of this disclosure provide techniques for predicting resource availability/utilization in a wireless network to allow for more efficient admission and/or resource allocation decisions. Embodiment techniques may predict a mobile station's future position based on mobile station mobility parameters, e.g., velocity, direction, etc. These predictions may allow network devices (e.g., APs, controllers, etc.) to make more intelligent admission/resource-allocation decisions. For example, embodiments of this disclosure may allow the AP 210 to predict that the mobile station 260 will migrate from BIN A to BIN B during the interim period (Δt) based on a mobility parameters associated with the mobile station 260 at the first instance in time (T). As a result of this prediction, the AP 210 may project that BIN A will not be overloaded during the second time instance (T+Δt), and consequently the AP 210 may device to approve the service request of the mobile station 270 at the first time instance (T).

In some embodiment, prediction techniques build migration probability tables from statistical information related to historical mobile station migration. For instance, network operators may analyze historical traffic loading information/statistics to identify migration tendencies in a given area as a function of mobility parameters. By way of example, an AP may determine a likelihood that a mobile station having a specific velocity will migrate from one geographic region to another over a fixed time period. This may be particularly advantageous in highly predictive mobility scenarios, e.g., mobile devices traveling along an interstate, etc.

Figure 3:
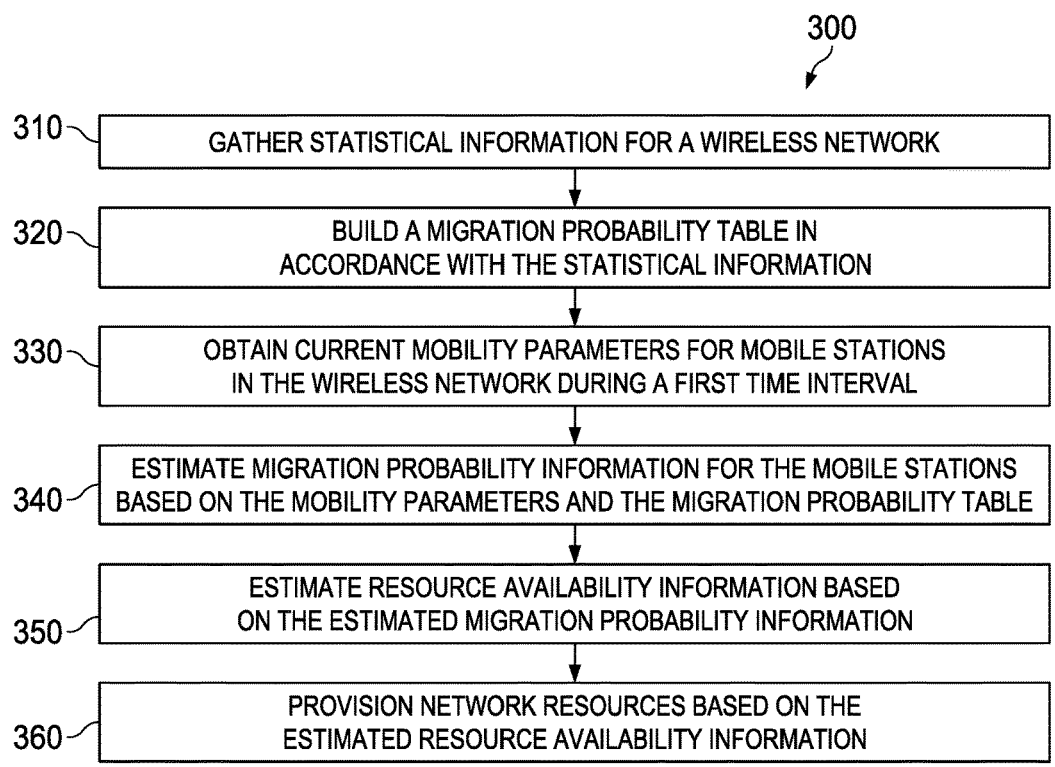
FIG. 3 illustrates a flowchart of an embodiment method for mobility prediction.

FIG. 3 illustrates an embodiment method 300 for mobility prediction, as may be performed by a network device (e.g., AP, scheduler, central controller, central entity, etc.). As shown, the method 300 begins with step 310, where the network device gathers statistical information for a wireless network. The statistical information may include bin-based statistical information relating to loading and/or traffic patterns in the network, and may be generated based on real-time network operation, network simulations, or combinations thereof. Thereafter, the method 300 proceeds to step 320, where the network device builds a migration probability table based on the statistical information. The migration probability table may associate mobility parameters (e.g., velocities, bin-location, etc.) with migration probabilities. Migration probabilities may indicate the likelihood that a mobile station having a certain mobility parameter (or set of parameters) will travel from one geographic location to another over a fixed period of time. Next, the method 300 proceeds to step 330, where the network device obtains current mobility parameters for mobile stations in the wireless network. The mobility parameters may be associated with a specific instance or period in time, such as a first interval. Subsequently, the method 300 proceeds to step 340, where the network device estimates migration probability information for the mobile stations based on the mobility parameters and the migration probability table. In one embodiment, the migration probability information may include a probability that a given mobile station will migrate from one bin to another during an interim period between the first time interval and a second time interval. In another embodiment, the migration probability information may include a set of probabilities that indicate likelihoods that a given mobile station will migrate from one bin to each of a plurality of neighboring bins over the course of one or more fixed time periods. For example, the set of probabilities may include a first probability (or sub-set of probabilities) that the given mobile station will migrate from BIN A to BIN B over a period (or set of periods), a second probability (or sub-set of probabilities) that the given mobile station will migrate from BIN A to BIN C over the period (or set of periods), and so-on and so-forth. In embodiments, the migration probability information may include a probability (or set of probabilities) for each mobile station in the network. Alternatively, the migration probability information may include probabilities for sub-sets of mobile stations (e.g., mobile stations near the cell-edge, mobile stations having high velocities, mobile stations in high-traffic bins, etc.). Next, the method 300 proceeds to step 350, where the network device estimates resource availability based on the estimated migration probability information. Thereafter, the method 300 proceeds to step 360, where the network device provisions network resources based on the estimated resource availability information. Different steps of the method 300 can be performed by different devices/entities. For example, a central entity may perform some steps, while a distributed entity may perform other steps. Some steps may be performed in parallel by multiple distributed entities.

Aspects of this disclosure may allow a centralized entity (e.g., a $3^{rd}$ party or a remote entity) to perform admission control without impacting quality of service (QoS) guarantees when users are migrating from one cell to another. In one example, resource usage expectations may be evaluated in future times to: obtain resource cost at each location bins as a function of loading of the neighboring links (e.g., prepared offline); obtain the probability that the each user might be in bin k in time T with the knowledge of past history or, in the absence of the same, using a mobility model); obtain the assignment probability for each location bin to a given access node for each time bin at different loading combinations; use increasing threshold margins for different time bins as uncertainty of prediction increases. Other aspects of this disclosure include guard band evaluation based on assignment probability and location which includes: using the current loading level and location of users and find the cost of each path and decide admissibility. A guard band may be used according to the expected traffic to a given cell using expected probability considering the decrease in uncertainty of this expectation for closer time bins.

Figure 4A:
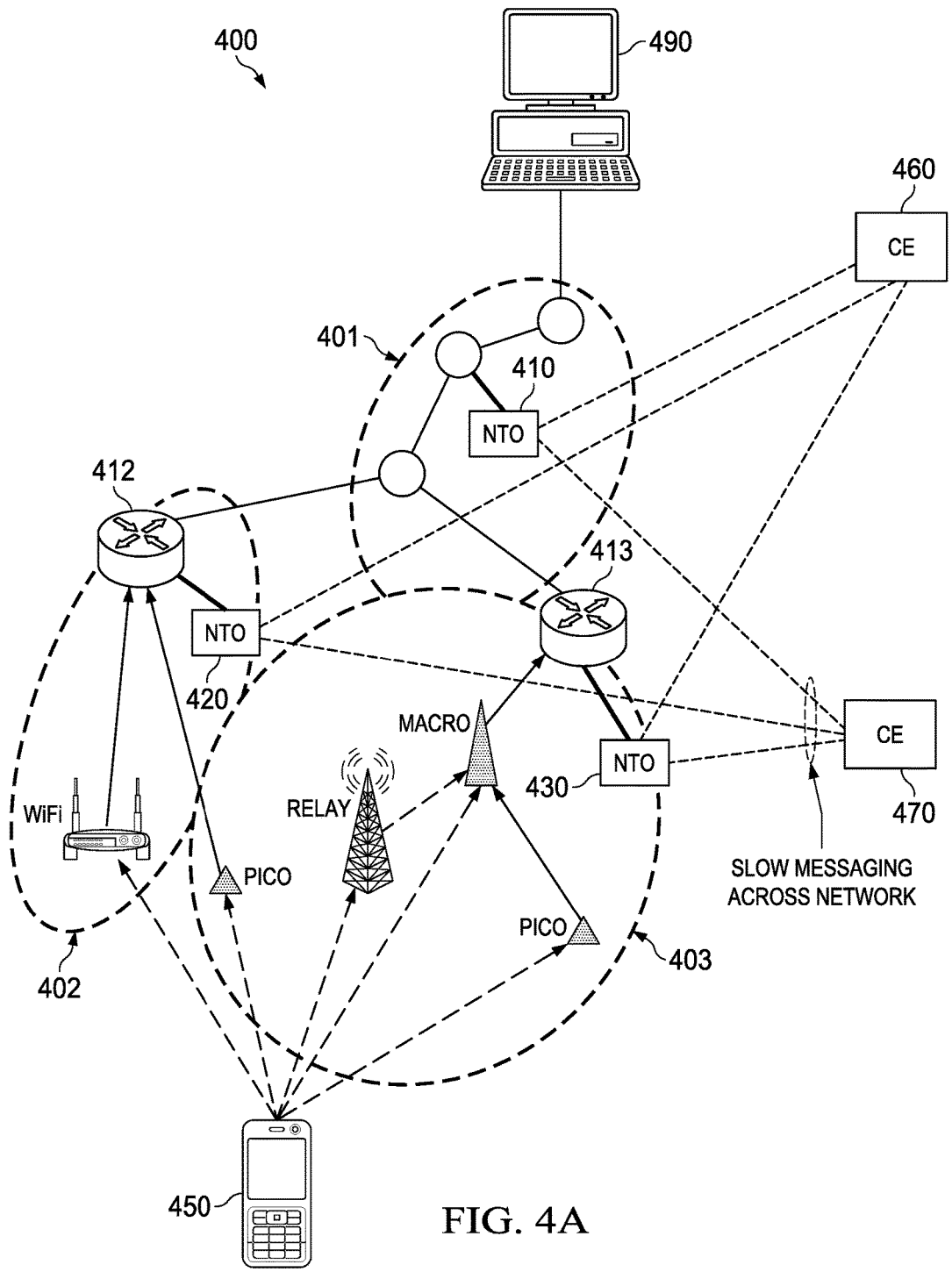
FIG. 4A illustrates a diagram of another embodiment communications network.
Figure 4B:
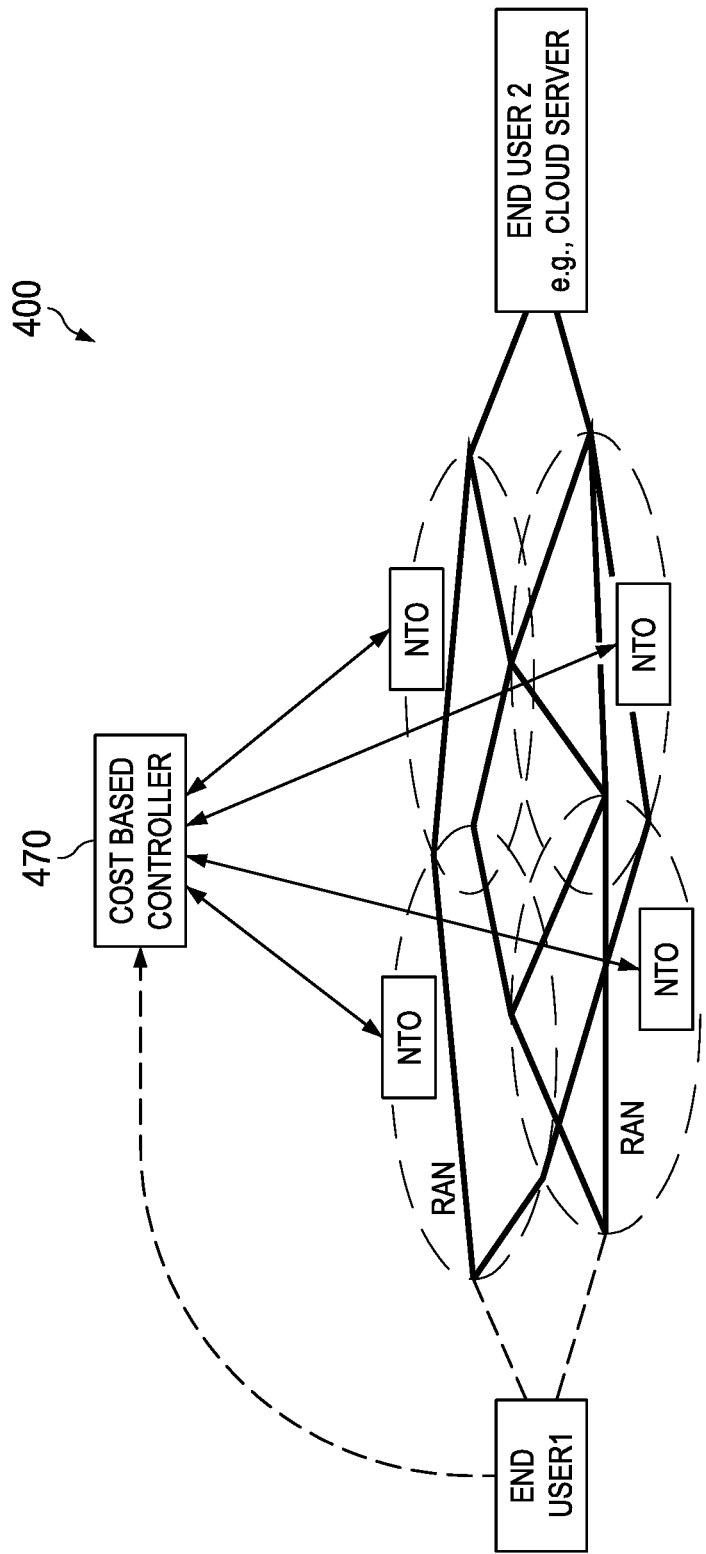
FIG. 4B illustrates a diagram of yet another embodiment communications network.

Embodiment techniques may be performed, or otherwise facilitated, by central entities, such as a telecommunications service provider (TCSP). FIG. 4 illustrates a network 400 in which a mobile station 450 interacts with a content provider 490. The network 400 includes central entities 460, 470 configured to interact with NTOs 410, 420, 430 to achieve mobility prediction for the mobile station 450. As shown, the NTOs 410 operates a core network 401, and the NTOs 420, 430 operate access networks 402, 403. The core network 401 may be any type of network capable of interconnecting the access networks 402, 403 with a content provider 490. In some embodiments, the access network 402 corresponds to a wireless local area network (WLAN) serviced by a Wi-Fi access point (AP), and the access network 403 corresponds to a radio access network (RAN) serviced by one or more network APs, e.g., macro base stations (BSs), pico BSs, relays, etc. Interactions between the core network 401 and the access networks 402, 403 may be handled by edge routers 412, 413.

In some embodiments, the central entities 460, 470 may coordinate mobility prediction between the networks 401-403. In one example, the central entity 470 may facilitate mobility prediction between regions assigned to APs of the access network 402, 403. For instance, the central entity 470 may retrieve statistical mobility information from the NTOs 420, 430, and compute a migration probability table that allows mobility prediction to be performed in real-time based on mobility parameters of a given mobile station or set of mobile stations. The central entity 470 may perform the mobility prediction directly by collecting dynamic mobility information and returning allocation instructions and/or mobility prediction results. Alternatively, the central entity 470 may distribute the migration probability table to the NTOs so that mobility prediction may be performed locally.

FIG. 4 illustrates an embodiment network 400 in which a central network entity 470 provides connectivity services. More specifically, the central network entity 470 considers user mobility in the admission process such that admission can be performed with greater accuracy. For each bin, a load/utility based cost function is provided to a controller beforehand (e.g., using offline evaluations) for different link load values (e.g., serving cell, neighbor cell, etc.) and different service types. Links inform the current loading/ utility and variation in regular intervals. Controller decides the admission and/or path (minimum cost path) given user requirement. Load may be quantized (for database entries), and can include neighbor's traffic density distribution.

Figure 5A:
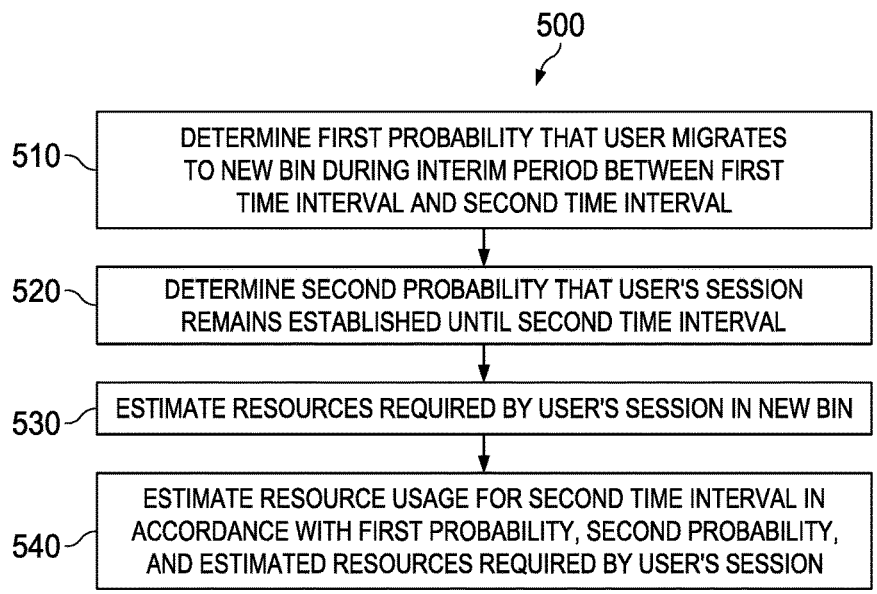
FIG. 5A illustrates a flowchart of an embodiment method for estimating resource utilization based on mobility prediction.

Aspects of this disclosure provide techniques for estimating resource availability based on mobility prediction. FIG. 5A illustrates a method 500 for estimating resource availability based on mobility prediction, as might be performed by a network device. As shown, the method 500 begins with step 510, where the network device determines a first probability that user (u) migrates to new bin during interim period between first time interval and second time interval.

Figure 5B:
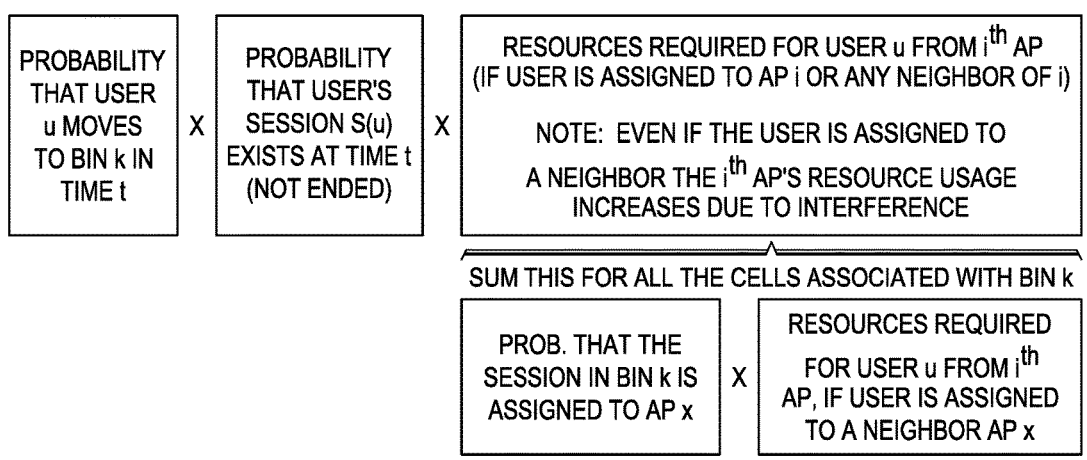
FIG. 5B illustrates a diagram of a technique for estimating resource utilization.

Next, the method 500 proceeds to step 520, where the network device determines a second probability that user's session remains established until second time interval. Thereafter, the method 500 proceeds to step 530, where the network device estimates resources required by user's session in the new bin. In some embodiments, this estimate may also include an indirect resource cost corresponding to a decreased spectral efficiency of neighboring links as a result of interference associated with the user's session. In some embodiments, the new bin may be serviced by a single AP, in which case there is a 100 percent probability that the user's session will be assigned to that AP. In other embodiments, the new bin may be serviced by a multiple APs, with each AP having an assignment probability for the bin, e.g., AP1 is assigned 50 percent of service flows in bin, AP2 is assigned 30 percent of service flows in bin, and AP3 is assigned 20 percent of service flows in bin. In this case, different resources requirements may be associated with different APs based on, inter alia, path loss between the bin and the corresponding AP. Moreover, the respective resource requirements may need to be weighted based on the assignment probability corresponding to the AP. In some embodiments, the total estimated resource required may be the sum of the weighted resource requirements for the multiple APs. Subsequently, the method 500 proceeds to step 540, where the network device estimates the resource usage for the second time interval in accordance with first probability, second probability, and estimated resources required by user's session. FIG. 5B illustrates an embodiment technique for estimating the resource usage. As shown, this technique multiplies the first probability, second probability, and the required resources to obtain an estimated resource usage.

Figure 6:
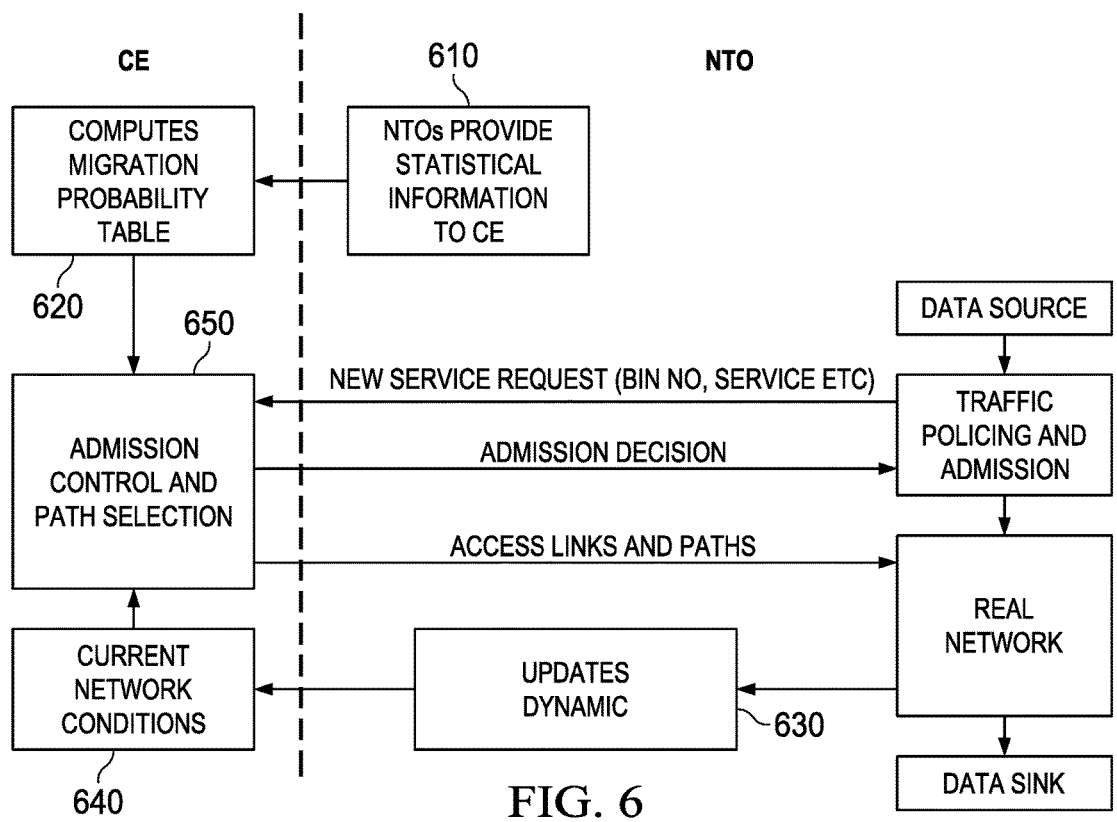
FIG. 6 illustrates a protocol diagram of an embodiment communications sequence for achieving mobility prediction.

Load based cost schemes disclosed herein may be more accurate than other schemes, as once a load is fixed, the variation of resource cost is small (e.g., aggressive service provisioning schemes can be developed). FIG. 6 illustrates a protocol diagram for an embodiment communications sequence 600 between a central entity and one or more NTOs. As shown, the communications sequence 600 begins with step 610, where the NTOs communicate statistical information to the CE. In some embodiments, the statistical information includes bin-based statistical information relating to loading and/or traffic patterns in networks operated by the NTOs. The loading and/or traffic patterns may be obtained from real-world data or simulations, and may indicate service session parameters (real, simulated, or otherwise) for a corresponding coverage area. For example, the loading information may indicate, inter alia, path loss information in various bins of a coverage area, and the traffic pattern information may indicate a mobility parameters and pathways/trajectories of a real or simulated service sessions.

Next, the communications sequence 600 proceeds to step 620, where the CE computes a migration probability table based on the statistical information provided by the NTOs. The migration probability table may specify migration probabilities based on, inter alia, the bin-location and mobility parameters of a given mobile station. In one example, the mobility parameters include a velocity parameter. In some embodiments, the migration probabilities may be associated with multiple fixed periods. For example, the migration probability may indicate that a mobile station traveling at given velocity has a first probability of migrating from bin A to bin B after a first period (e.g., after one time-slot), a second probability of migrating from bin A to bin B after a second period (e.g., after two time-slots), and so-on and so-forth.

Thereafter, the communications sequence 600 proceeds to step 630, where the NTOs report dynamic updates to the central entity. The dynamic updates may include various real-time network parameters, such as loading, traffic patterns, latency, interference, and/or other relevant network information. Subsequently, the communications sequence 600 proceeds to step 640, where the central entity evaluates the current networks conditions in accordance with the dynamic updates provided by the NTOs. Thereafter, the communications sequence 600 proceeds to step 650, where the central entity makes admission and path selection for the network based on the migration probability table, the current network condition evaluation, and new service requests received by the NTOs.

In some embodiments, the current network condition evaluation may produce an internal loading image. This internal loading image may be generated via simulation, and may be tracked and updated with real data. Additionally, the current network condition evaluation may utilize a cost function to estimate resources required to sustain (or establish) a service flow in a bin location. The cost function can be modified to be aggressive or conservative based on network conditions (e.g., a delta). For simulations, loading in different cells may be varied to obtain resource cost function (RCF), and each potential link may have its own cost vs. load function. Some admission control schemes may assume or use a 'Resource Guard Band' for mobility consideration. Embodiment admission control schemes of this disclosure take the impact of mobility on resource usage into consideration, in addition to evaluating the required guard band. Some embodiments may use the same Resource Cost Function as described in U.S. Provisional Patent Application 61/737,551, which is incorporated herein by reference as if reproduced in its entirety. Some embodiments may require the probability that a user is associated with a given bin assigned to a given cell. This is assumed to be obtained from operator of each link, e.g. network owner/operator (NTO), based on the historical data.

Figure 7:
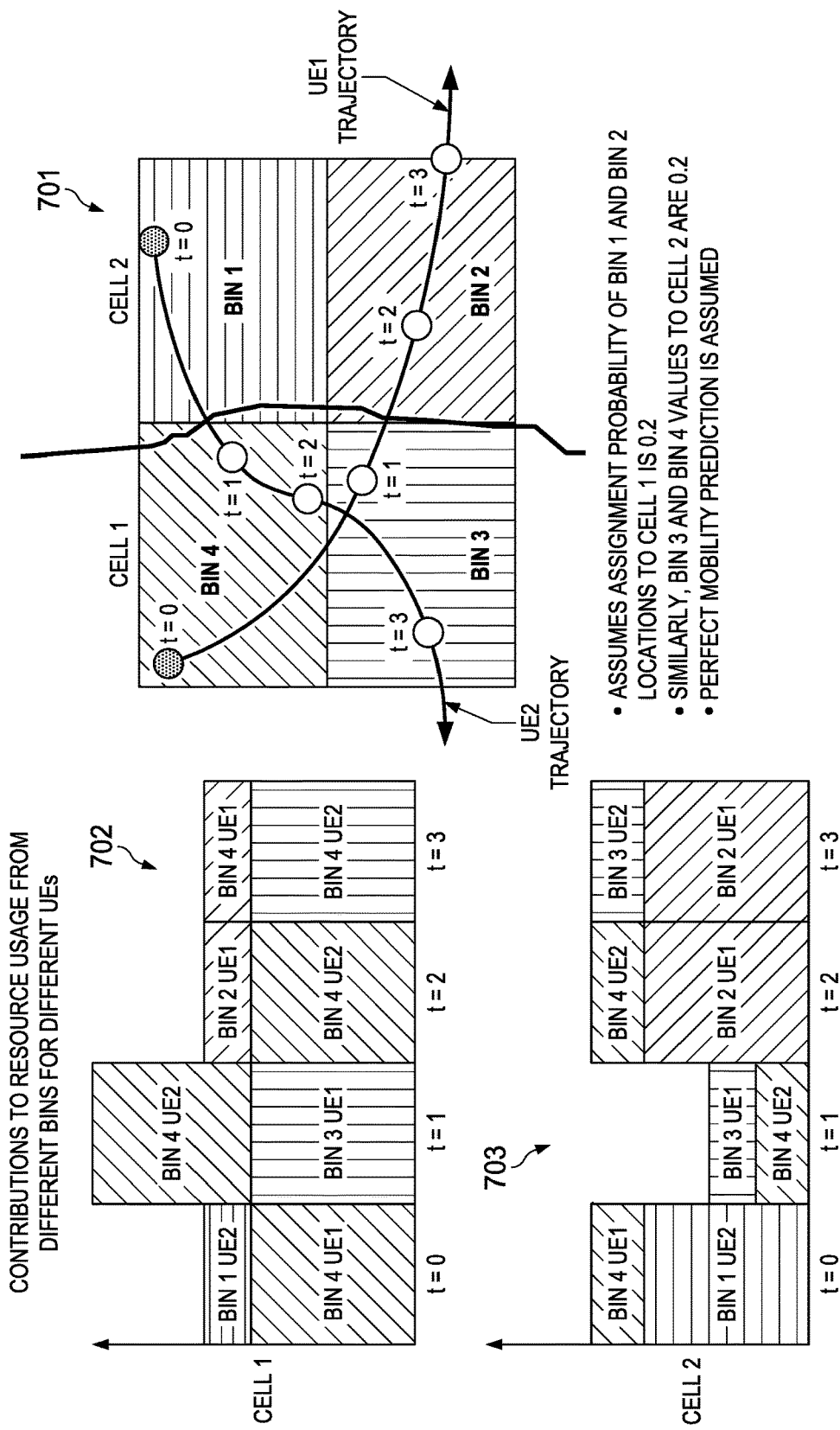
FIG. 7 illustrates a diagram depicting estimated mobile station migration trajectories and resulting resource usage predictions.

Aspects of this disclosure provide techniques for estimating resource utilization/availability based on mobility parameters of mobile stations. FIG. 7 illustrates a diagram 701 of estimated service session trajectories and diagrams 702, 703 of corresponding resource utilization projections, which may be obtained using embodiment techniques provided herein. As shown, the diagram 701 depicts projected trajectories for a first user equipment (UE1) and a second user equipment (UE2). The trajectories begin at a current time (t=0), and extend over three future times (t=1, t=2, and t=3). The diagrams 702, 703 depict estimated resource usage for the current time and the three future times for two cells depicted in the diagram 701.

Aspects of this disclosure provide techniques for evaluating guard bands based using the migration probabilities. In one example, additional resource usage for users moving from one cell to the other is determined in accordance with an arrival rate of the new services. Thereafter, a required guard band is determined. In another embodiment, mobility is determined in accordance with an expected resource usage by handover calls. In this scheme, time is divided into time bins. The algorithm evaluates the expected usage of resources in cell j, at time bin t, using the following information: The probability a user can be at a given bin k in time t (can be designed using a generic mobility prediction method knowing current location and the speed. More accurate historical data based model could also be used.); the probability that a user at bin k be assigned to cell j (this is also new information that may be obtained using historical data. This may be a function of routing and scheduling scheme as well as loading. An approximation may be assumed as fixed once loading is known.); and the resource usage of the user when it is in bin k (similar to that described above).

With respect to an embodiment method based on expected resource usage. An area is divided into bins. Equal number of bins with sufficient granularity. Regions with equal geometry are assigned a bin. More appropriate for these two cases: For uplink, and geometry is evaluated for a fixed IOT. For downlink when the power is fixed this can be used. For downlink when power is not fixed, average geometry taking different power combinations have to be used. For each bin, estimated resource need $R_{est}$ from a given cell is evaluated using the probability of user being at bin k at time t, resources required for that service at bin k, and the assignment probability at bin k to cell i for a given service type under the given load matrix as shown below. $R_{est}(t, i, u) = \Sigma_{u\ in\ cell\ i} \Sigma_{k\ in\ cell\ i} P_m(t, k, u), (1-P_d(t, u)). R_r(k, L(t), S(u)). P_a(k, L(t), S(u))$, where $R_{est}(t, i, u)$ is the expected resource usage by the user u in cell i at time t, $P_d(t,u)$ is the probability that a user will be departed before a time period (t) has elapsed, $P_m$ is the probability of user u moving to bin k at time t, and $P_a$ are the resources required and assignment probability (to cell i) respectively, at bin k when loading vector (including neighbor load) L(t) s for service class of the user u.

Notably, Pa and Rr could be evaluated based on past data or off-line online simulations/ emulations. Further, "All k in cell i" may mean that all bins having non-zero assignments probability to cell i. Pm depends on the mobility model. Further, "All u in cell i" may mean that all UEs having a non-zero probability to move to "All bins in cell " in time t.

With respect to another embodiment method based on expected resource usage. Now admission control is done for this service as below. The total estimated resource usage for all the users at time t for cell I is computed, and then it is determined whether the following is satisfied for all t, t<t max to admit the call. The following equations may be used to compute expected resource usage: $R_{total\_est}(t, i) = \Sigma_{u\ in\ cell\ i} R_{est}(t, i, u)$; $f_{cost}(R_{total\_est}(t, i)) < T_{cost} - uM(t)$, where uM(t) is the cost margin kept for uncertainty of the expected cost over time, $T_{cost}$ is the cost threshold to be used for admission, and $f_{cost}(.)$ is the cost function used by the resource owner based on the total resource usage.

In some embodiments, "cost guard band" depends on how much loading would move to this cell in the near future from the neighboring cells and how much load is moved out to neighbor cells from this cell. It may be possible to apply weights to some of the gap(s) using the following equation: $\Sigma_{t=1}^{tmax} W(i). (T_{cost} - uM(t) - f_{cost}(R_{total\_est}(t, i))) > 0$.

With respect to an embodiment guard band method. In this approach, it is evaluated whether the expected amount of resources that is needed within some time to cater for the handed in sessions from the neighbors. The evaluation is performed in accordance with the following: $B_{est}(t, i) = \Sigma_{all\ j\ in\ neighbour\ list} \Sigma_{u\ in\ cell\ j} R_{est}(t, i, u)$, wherein $B_{est}(t, i)$ is the total expected resource usage in cell i at time t by the users in all the neighbor cells.

Now the expected load reductions due to handoffs from cell i to other cells are removed in accordance with the following:

$$B_{add}(t,i) = B_{est}(t,i) - \Sigma_{all\ j\ in\ neighbour\ list} \Sigma_{u\ in\ cell\ i} R_{est}(t,j,u)$$

Now the additional bandwidth is weighed to give immediate bandwidth a higher weight. This is done in accordance with the following: $B_0 = \Sigma_{t=1}^{T} W(t-t_0) * B_{add}(t,i))$.

Finally, a cost margin is applied. The cost margin is to be used as a guard band which depends on the average arrival rates in cell i for different service types A(i, s(u)). Applying different margins to different services may avoid excessive call drop outs for handovers. The cost margin is applied in accordance with the following: $\Delta T(s(u)) = f_{cost_{margin}}(A(i,s(u)), B_0)$.

Thereafter, to admit a call in cell j, it may be useful to apply the margin on top of previous admission control algorithm provisional filing HW 81086298US01 as may be performed in accordance with the following: $f_{cost}$ (additonal resource) $< T_{cost} - \Delta T(s(u))$ Aspects of this disclosure are relevant to an admission control method which takes mobility, and include: areas are divided into bins; associated with each bin is a probability that a service type S is served by a given cell (using historical data, or geometry); the expected resource usage of a mobile at different time slots are evaluated using the expected probability of the user in a given bin at that time slot and the assignment probability of that service at that bin; the cost is estimated based on a cost function for this resources usage; a cost will be estimated for the call for all the other cells; if the cost is lower than a threshold admit the call. The required bandwidth does not depend on the additional bandwidth required. It is the handoff rate, a handover rate and new call rate (weighted by Ref which needs bandwidth reservation.)

Additional aspects of this disclosure include assignment probability, bin to bin transition probability, departure expectation, and expected resources for future times. Benefits provided by this disclosure include providing a variety of virtual network services when control links are slow; routing and cost based admission may not differ greatly from optimal routing scenarios.

The following references are related to subject matter of the present application. Each of these references is incorporated herein by reference in its entirety: Wikipedia, "Asynchronous Transfer Mode"<http://en.wikipedia.org/wiki/Asynchronous Transfer Mode>; Wikipedia, "Open Shortest Path First" <http://en.wikipedia.org/wiki/Open Shortest Path First>; and Mostafa Zaman Chowdhurya, Yeong Min Janga, and Zygmunt J. Haasb, Department of Electronics Engineering, Kookmin University, Korea "Call Admission Control based on Adaptive Bandwidth Allocation for Multi-Class Services in Wireless Networks", *Wireless Networks Lab, Cornell University, Ithaca, N.Y., 14853, U.S.A*

Figure 8:
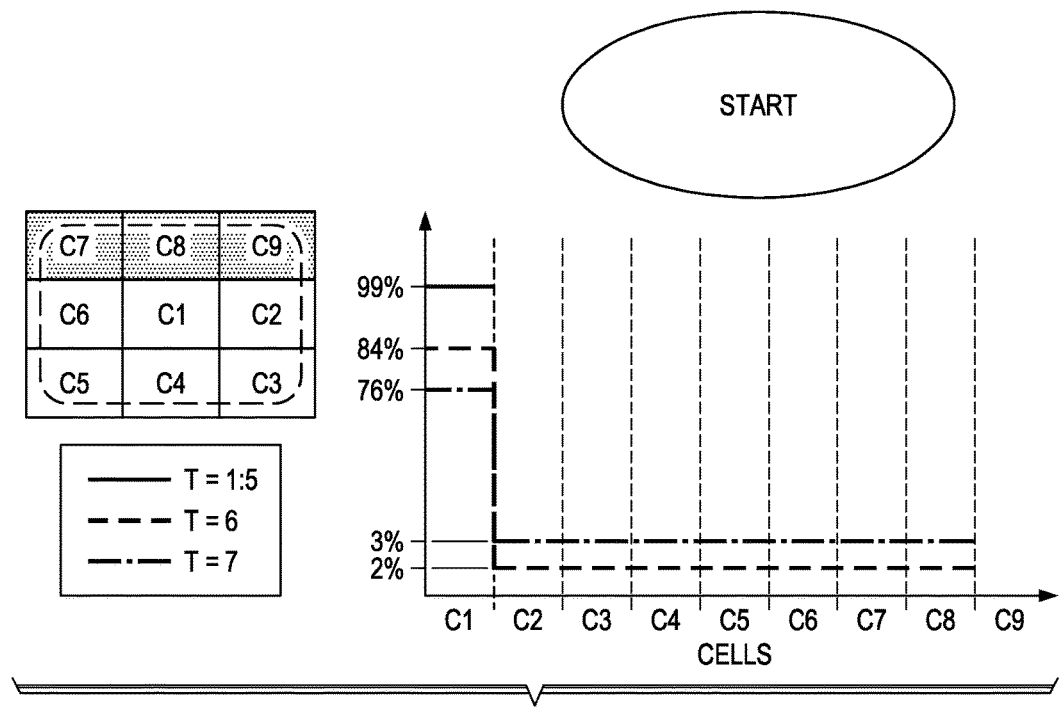
FIG. 8 illustrates a diagram depicting migration probabilities for multiple cells over a sequence of periods.

Aspects of this disclosure allow multiple migration probabilities to be considered when estimating resource utilization/availability. In some embodiments, migration probabilities can be predicted based without any velocity information. FIG. 8 illustrates an embodiment for estimating the location of a user (starting in cell 1) over the next seven time periods with no velocity information being known for the user. As shown, there is a high probability (e.g., 99%) that the user will remain in cell-i for the next five timeslots. Thereafter, the user has a small probability (e.g., 2%) of migrating to any of the neighboring cells during the sixth timeslot, and a slightly larger probability (e.g., 3%) of migrating to any of the neighboring cells during the seventh timeslot. Hence, the user's likelihood of migrating to a different cell increases over time, even when no velocity information is known.

Figure 9:
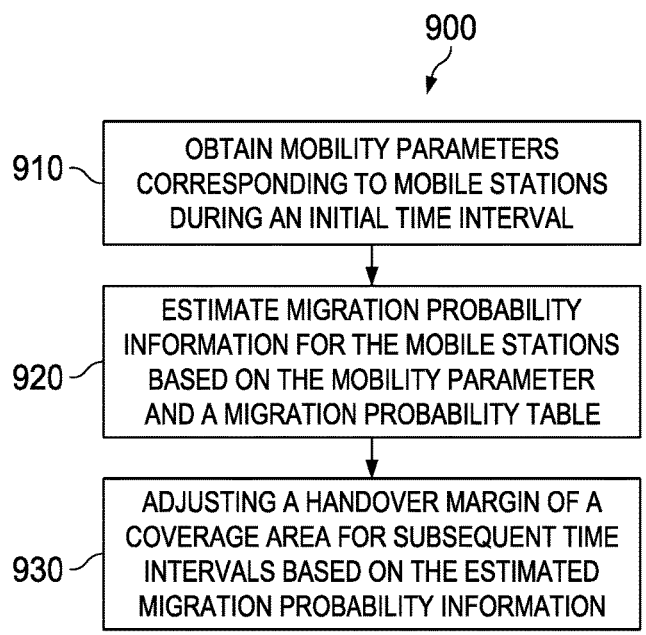
FIG. 9 illustrates a flowchart of an embodiment method for adjusting handover margins based on mobility predictions.

Aspects of this disclosure provide techniques for adjusting handover margins based on mobility predictions. FIG. 9 illustrates an embodiment method 900 for adjusting handover margins based on estimated migration probabilities, as may be performed by a network device. As shown, the method 900 begins at step 910, where the network device obtains mobility parameters corresponding to one or more mobile stations during an initial time interval. The mobile stations may include any mobile station in or near a coverage area. Next, the method 900 proceeds to step 920, where the network device estimates migration probability information for the one or more mobile stations based on the mobility parameters and a migration probability table. The migration probability information may include probabilities that the mobile stations will access the network from the coverage area at a future time intervals. For example, the migration probabilities may indicate a probability that each mobile station currently inside the coverage area will remain inside the coverage area, as well as a probability that mobile stations outside the coverage area will migrate into the coverage area. Thereafter, the method 900 proceeds to step 930, where the network device adjusts a handover margin of the coverage area for one or more subsequent time intervals based on the estimated migration probability information.

Figure 10:
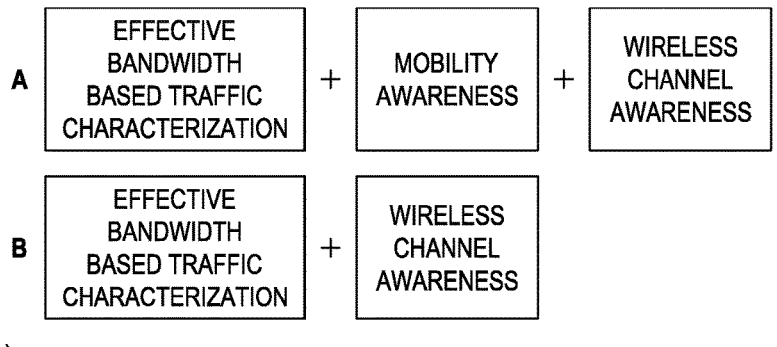
FIG. 10 illustrates block diagrams of high level techniques for predicting resource availability.

FIG. 10 illustrates block diagrams of high level techniques for predicting resource availability. The first technique includes combining an effective bandwidth-driven traffic characterization, mobility awareness, and wireless channel awareness. The second technique includes combining an effective bandwidth-driven traffic characterization and wireless channel awareness.

With respect to home traffic, aspects of this disclosure predict the spectral efficiency of an active UE at any given time according to offline channel and mobility data, or online channel and mobility data, or both. Thereafter, the resources needed for QoS support may be computed based on effective bandwidth.

Figure 11:
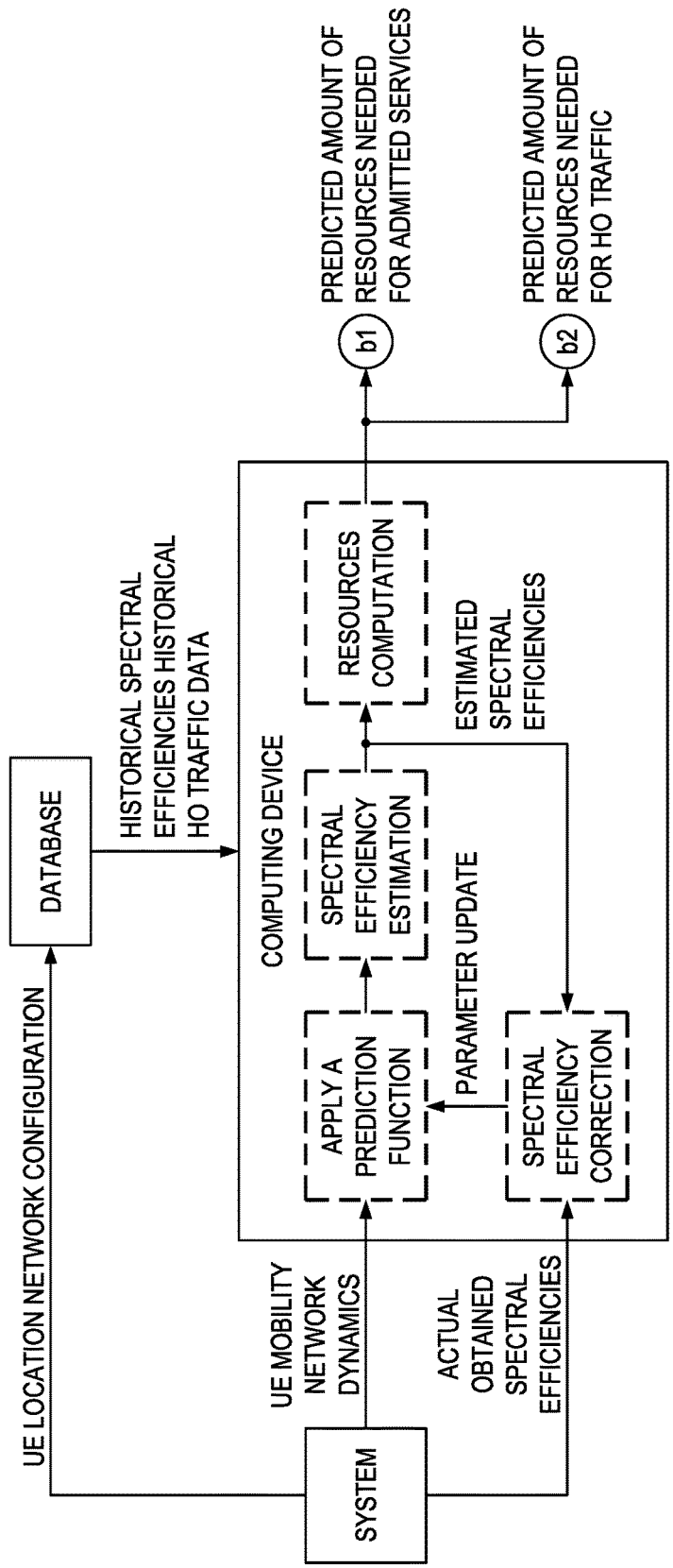
FIG. 11 illustrates a diagram of an embodiment system for predicting resource availability.

With respect to handover traffic, aspects of this disclosure compute the resources reserved for QoS support for handover traffic based on historical data using effective bandwidth. Thereafter, the reservation pattern is adjusted based on online data (e.g., UE shadow clustering). The remaining resources can be computed by subtracting the resources needed for home traffic and handover traffic and guard bands, if any. FIG. 11 illustrates an embodiment system for predicting resource availability.

Figure 12:
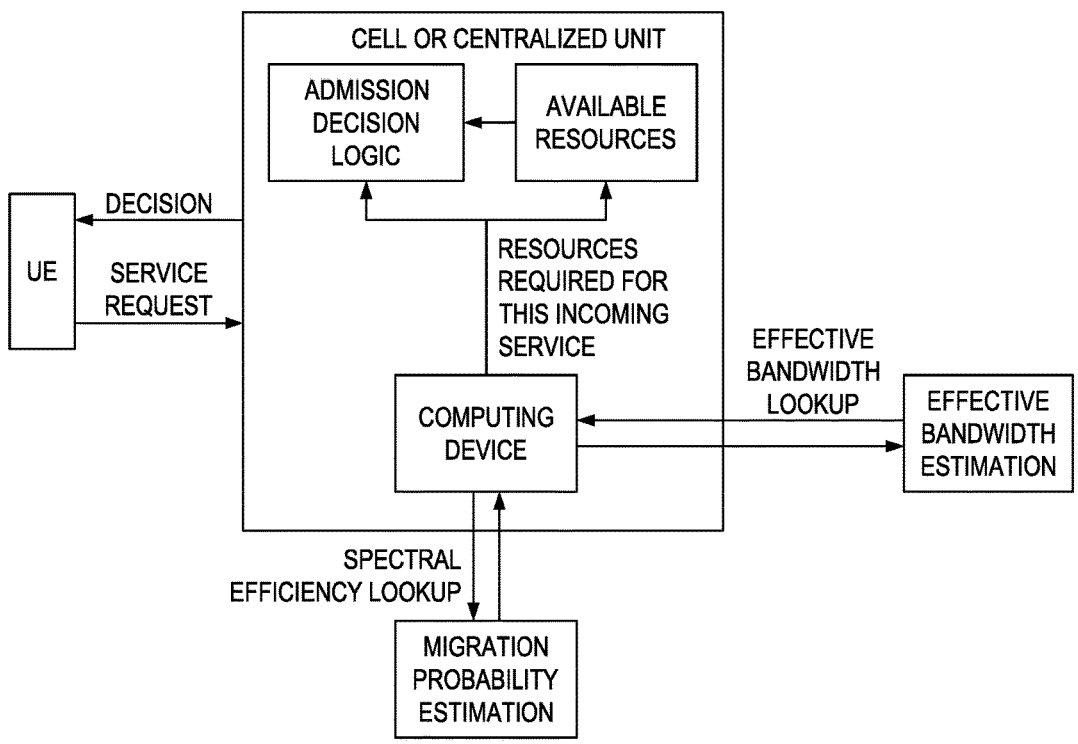
FIG. 12 illustrates a diagram of another embodiment system for predicting resource availability.

Aspects of this disclosure predict the amount of amount of available resources via effective bandwidth with traffic multiplexing gain for service admission in wireless networks. FIG. 12 illustrates another embodiment system for predicting resource availability.

Figure 13:
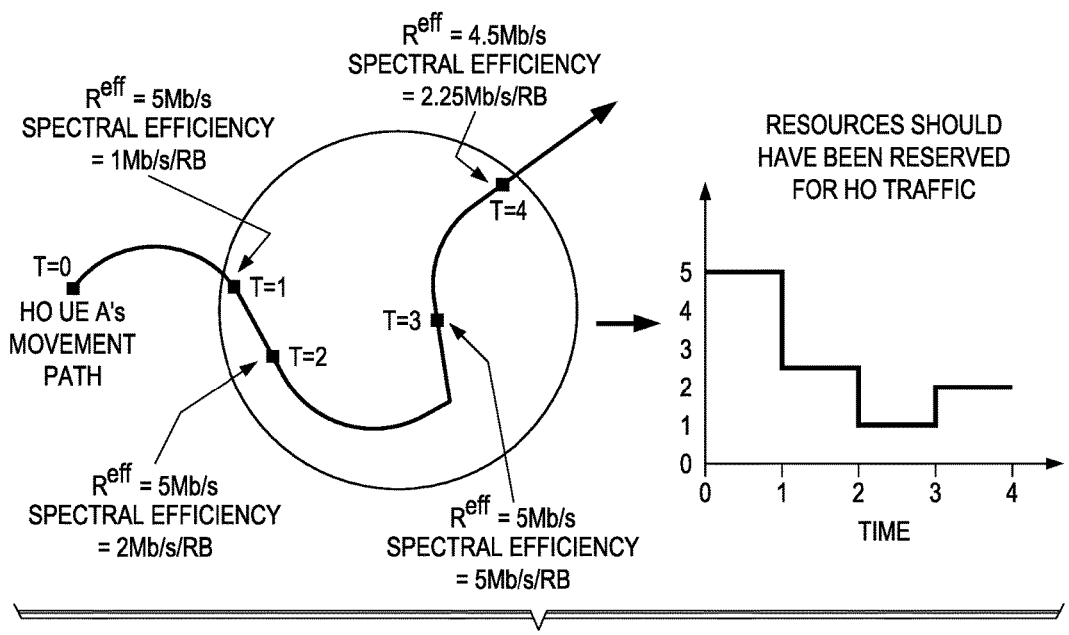
FIG. 13 illustrates a diagram depicting estimated resource requirements for a service flow along a projected migration trajectory.
Figure 15:
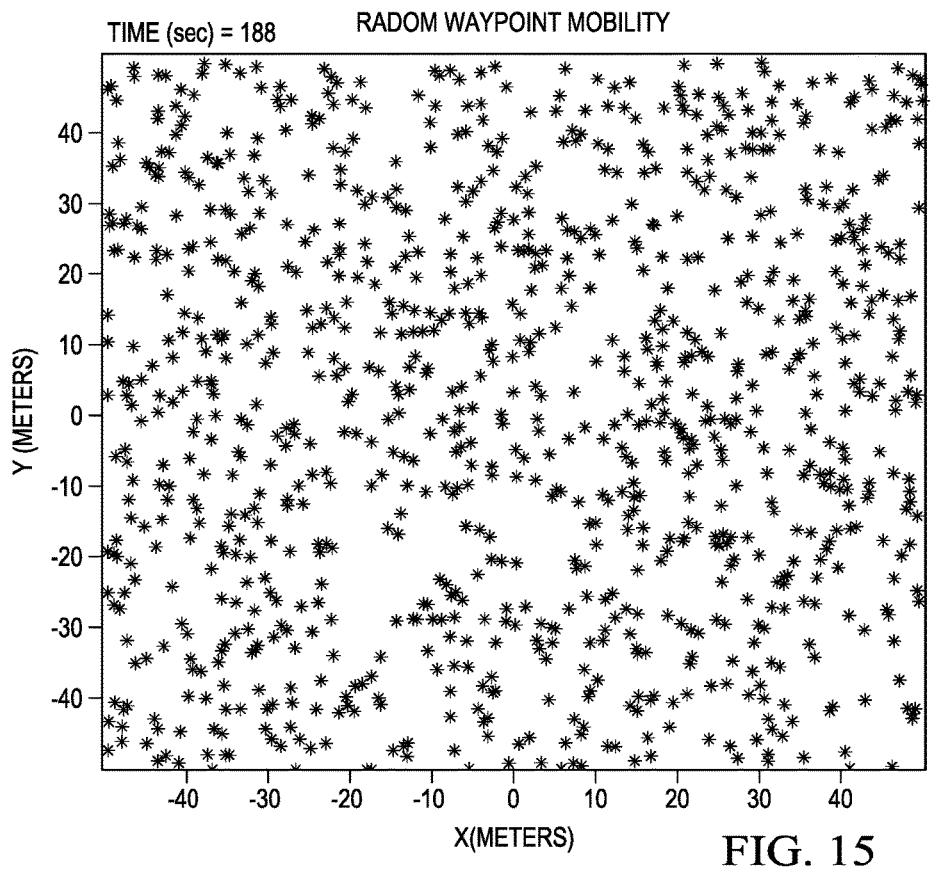
FIGS. 15-20 illustrate graphs of simulation results obtained from embodiment migration predictions techniques.

Aspects of this disclosure allow resource requirements of mobile station to be estimated as a function of projected migration trajectory. More specifically, a mobile stations migration trajectory can be predicted based on mobility parameters, and thereafter, the path loss for each point on the trajectory can be estimated using, inter alia, network loading information. FIG. 13 illustrates a diagram for projecting different resource requirements along a projected trajectory of a mobile station. As shown, the projected resource requirement of the mobile station changes based on the spectral efficiency of each point along the estimated trajectory.

In an embodiment, an access point logs or sends the following information to a centralized entity: the traffic information of each HO traffic flow; the service holding time of this HO flow when it's serviced by this access point; the movement of each HO traffic flow.

Figure 14:
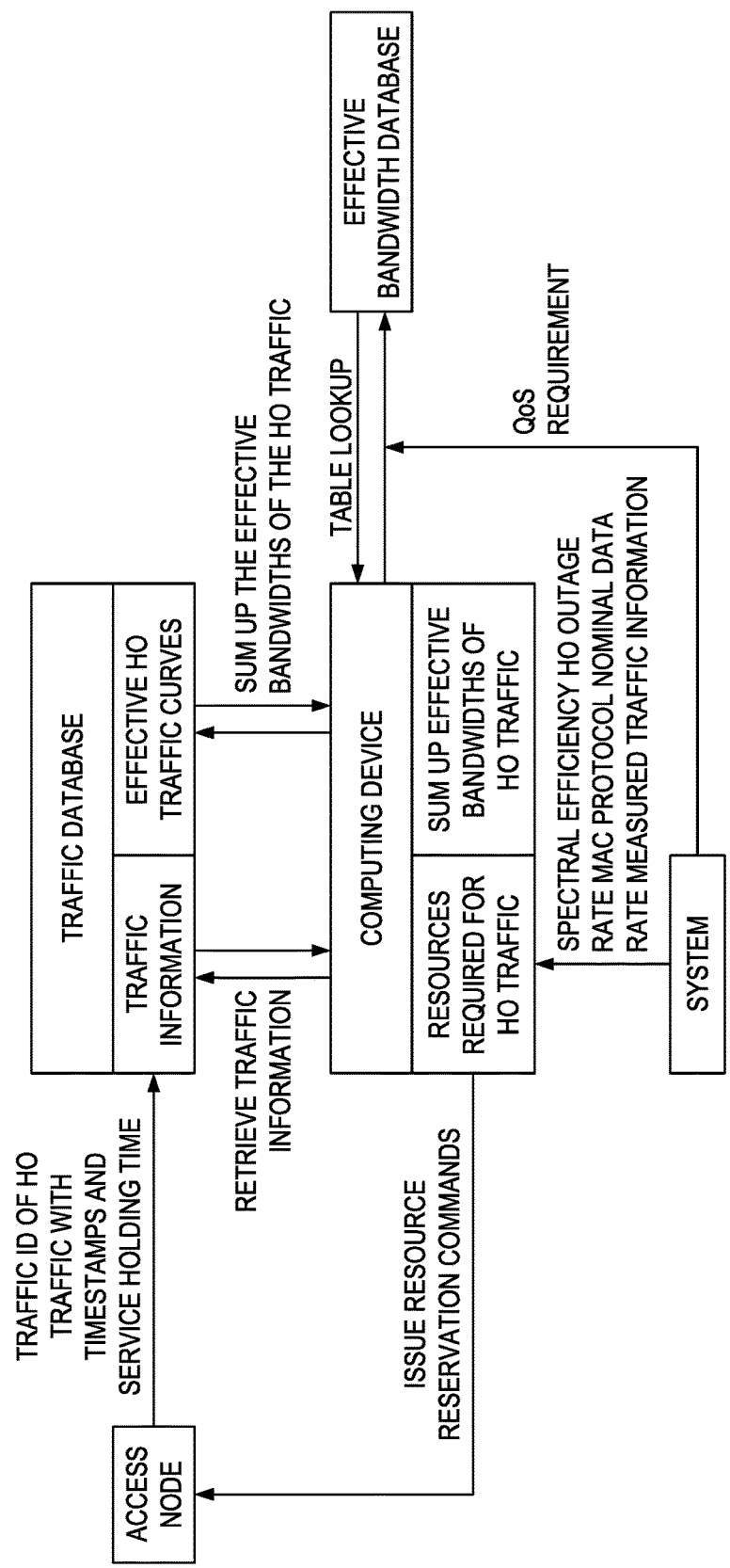
FIG. 14 illustrates a diagram of another embodiment system for predicting resource availability.
Figure 16:
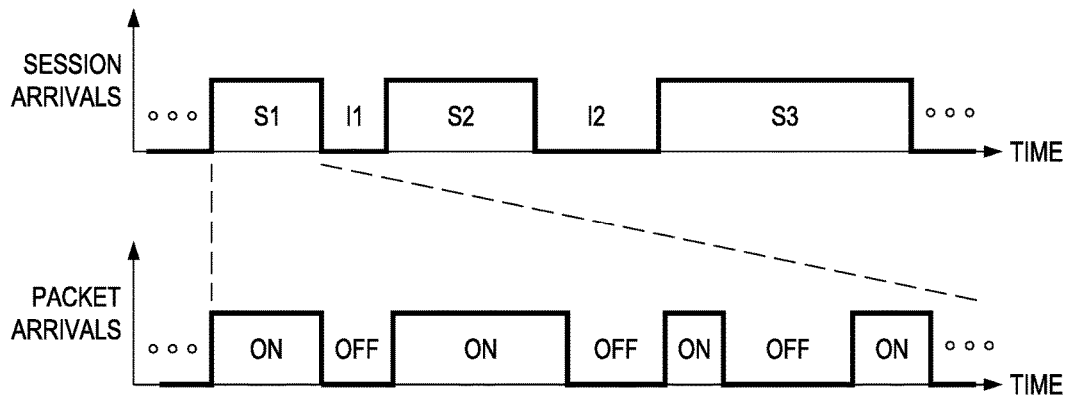
Figure 17:
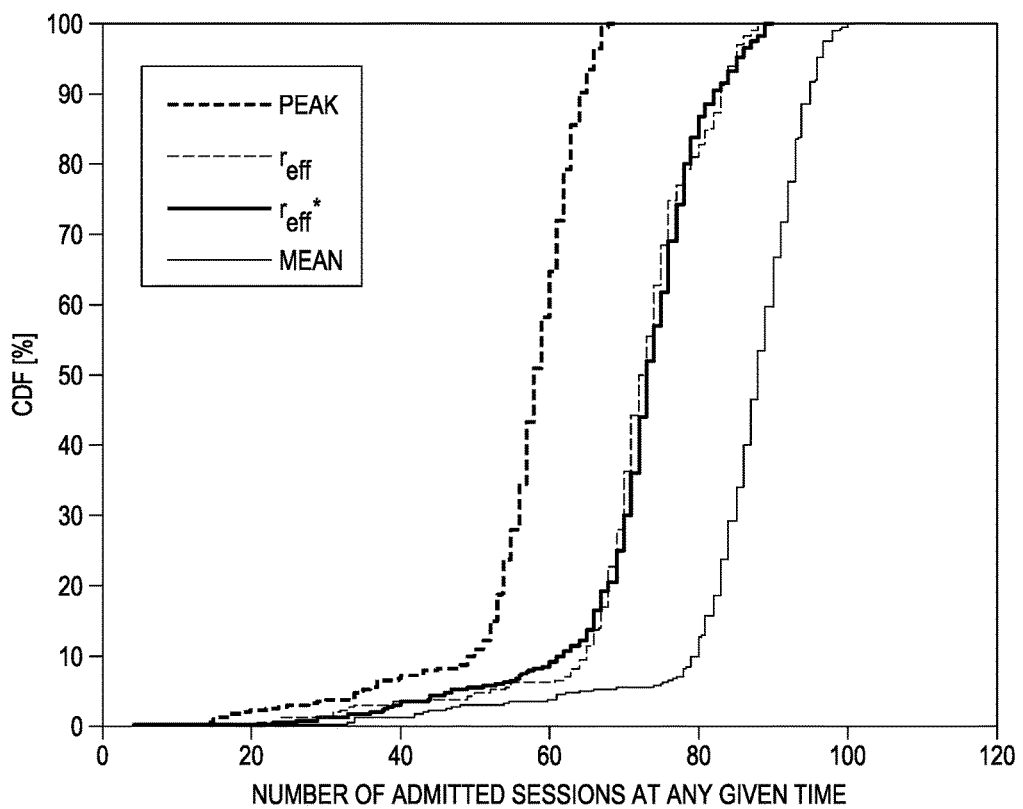
Figure 18:
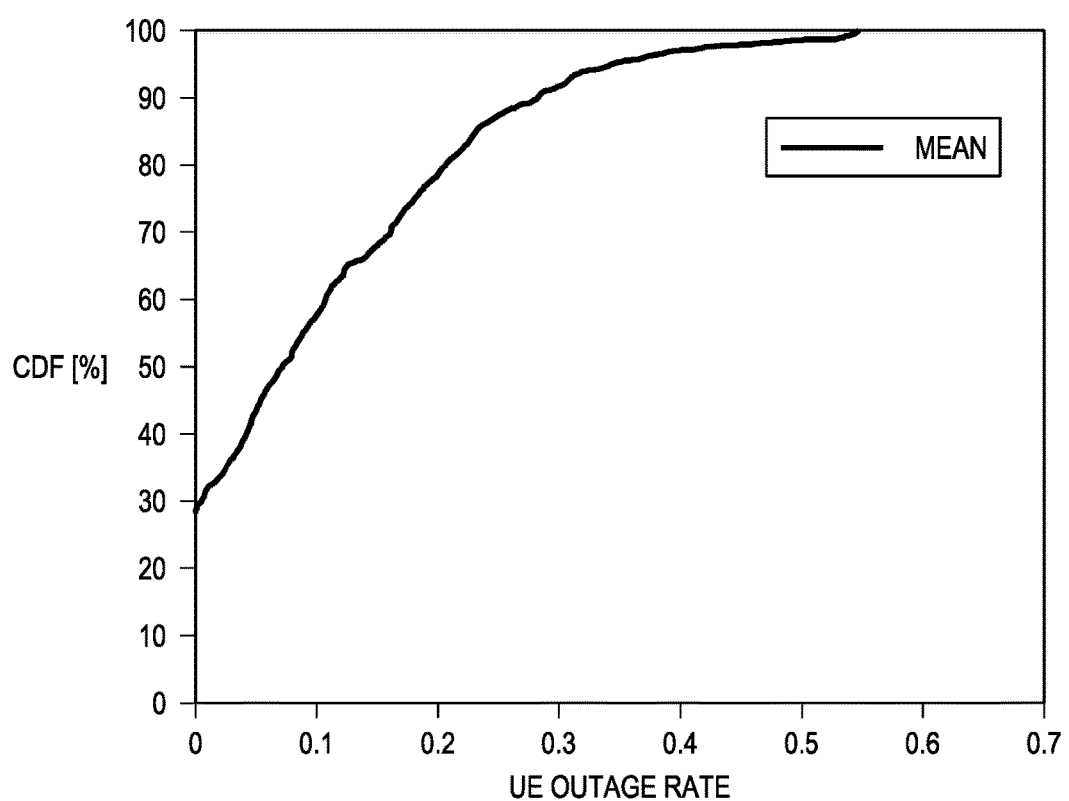
Figure 19:
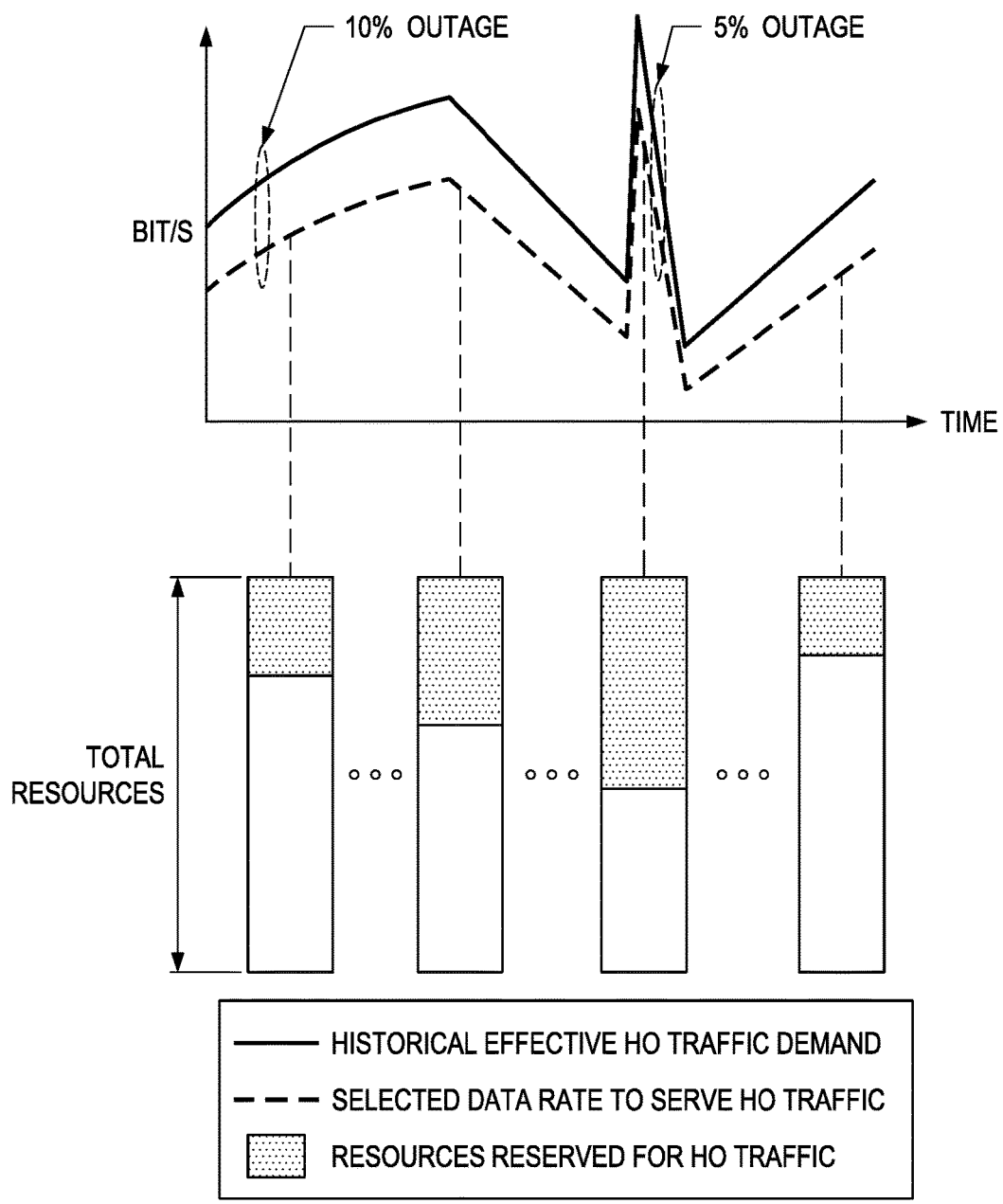
Figure 20:
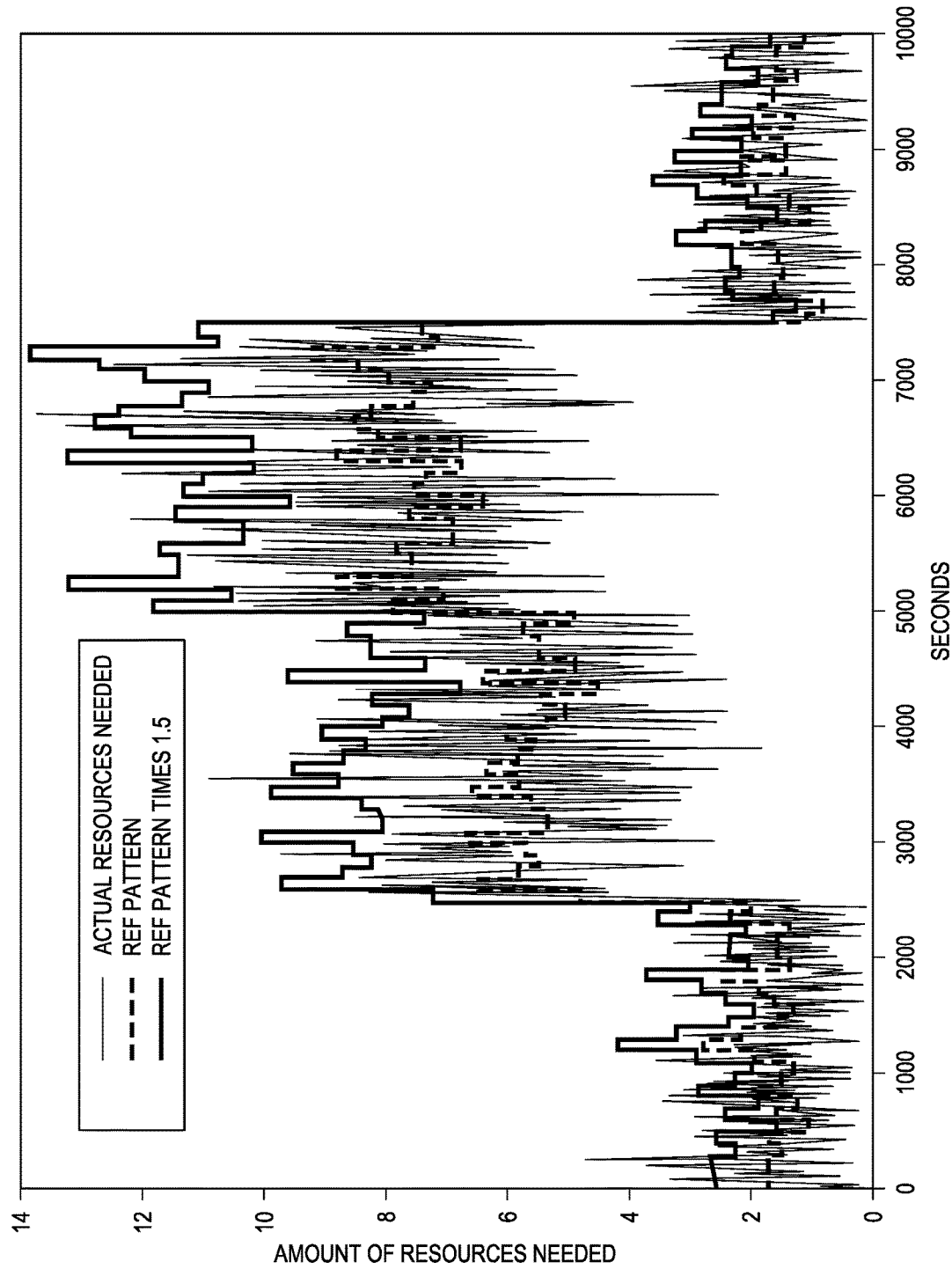

This traffic information is then converted to an effective bandwidth either locally or remotely at a central entity. Thereafter, a spectral efficiency is retrieved from a database for those locations experienced by the UEs. After the fact, this access point or the central entity can compute an actual amount of resources needed for this HO traffic flow. Computing the actual amount of resources may include summing up all the resources needed for HO traffic flows at any time window and store this information in the database. Given a particular network configuration, it may be desirable to average as many samples as possible in the database. This offline data is used to compute a reference resource reservation curve for HO traffic. FIG. 14 illustrates a diagram of another embodiment system for predicting resource availability.

Aspects of this disclosure may compute semi-static or dynamic resource reservation for HO traffic in accordance with offline historical data, which saves online signalling overhead. No information exchange among access nodes is needed.

FIGS. 15-20 illustrate simulation results using a simulations setup outlined as follows: Topology=100 m×100 m; 1 cell (with X amount of resources in Hz); Number of stationary UEs=1000 (all served by a cell located at (0,0)); Spectral efficiency=$1/distance^2$; Number of sessions=1000; Session duration=random variable {1,1000}; Idle period=random variable {1,100}; Traffic source=ON-OFF traffic (alpha, beta, R)=(2,3,1000 b/s); Rate of each sessions are Peak=1000b/s, Mean=400b/s, and Effective bandwidth=612.5b/s with 1% outage probability (due to buffer overflow exceeding 40 cells); UE scheduling=random order; simulation time=1,000 seconds (iseed). Schemes considered include Peak, Mean, Standard effective bandwidth (r_eff), and Effective bandwidth with multiplexing gain (r_eff*).

Figure 21:
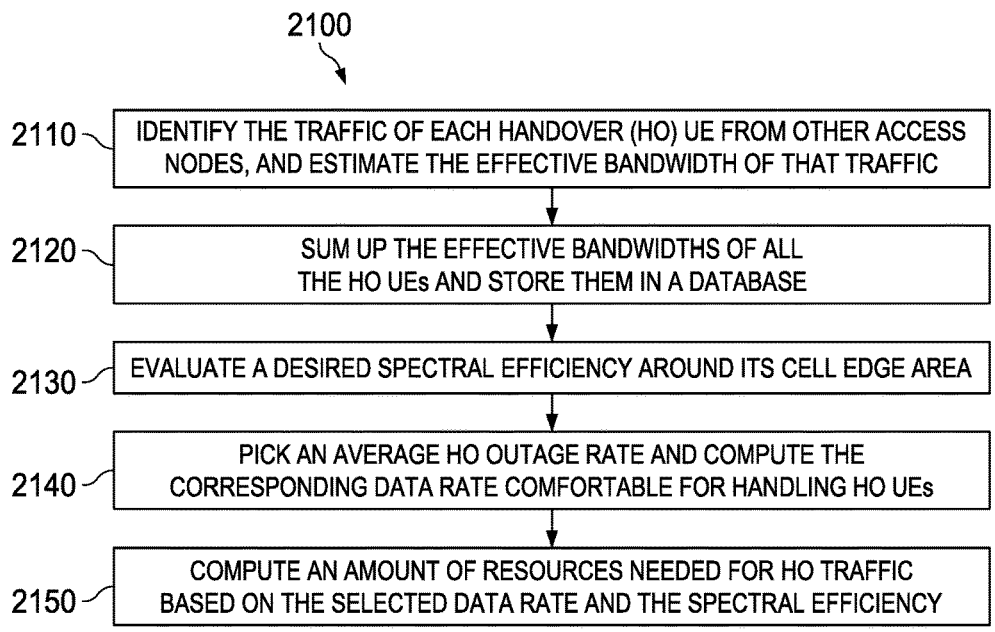
FIG. 21 illustrates a flowchart of an embodiment method for computing resources needed for handover traffic.

FIG. 21 illustrates a method 2100 for computing resources needed for handover traffic, as may be performed by a network device. As shown, the method 2100 begins at step 2110, where the network device identifies traffic that is likely to be handed over from other nodes, and estimates the effective bandwidth of that traffic. Next, the method 2100 proceeds to step 2120, where the network device sums up the effective bandwidths and stores them in a database. Thereafter, the method 2100 proceeds to step 2130, where the network device evaluates a desired spectral efficiency around its cell edge area. Subsequently, the method 2100 proceeds to step 2140, where the network device picks an average HO output rate and computes the corresponding data rate for handling the handovers. Thereafter, the method 2100 proceeds to step 2150, where the network device computes an amount of resources needed for the handover traffic based on the selected data rate and the spectral efficiency.

Other aspects of this disclosure adjust the reference resource reservation pattern curve using real-time system measurements as follows: for each time window, compute the difference between an expected amount of resources needed using on offline data and an actual amount of resources needed for HO traffic; the actual amount of resources reserved for HO traffic is a function of an expected amount of resources needed using on offline data and the previous resource differences for HO traffic.

Figure 22:
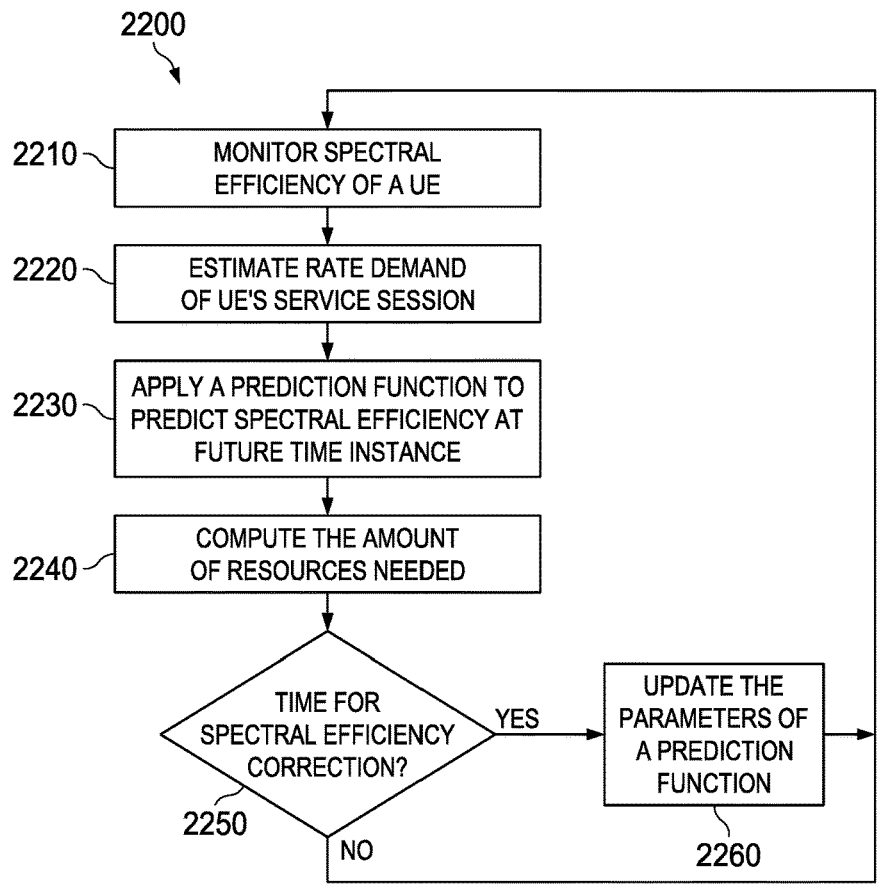
FIG. 22 illustrates a flowchart of an embodiment method for updating parameters of a spectral efficiency prediction function based on spectral efficiency feedback data.

FIG. 22 illustrates a method 2200 for updating a parameter of a spectral efficiency prediction function based on resulting spectral efficiency data fed back from the network, as may be performed by a network device. As shown, the method 2200 begins at step 2210, where the network device monitors spectral efficiency of a UE's service session. Next, the method 2200 proceeds to step 2220, where the network device estimates a rate demand of the UE's service session at a future instance in time. The estimation may be based on traffic characteristics of the UE's service session, historical rate demands, or other parameters. Next, the method 2200 proceeds to step 2230, where the network device applies a prediction function to generate an estimated spectral efficiency of the UE's service session at a future instance in time. The function may include variables corresponding to historical and/or dynamic network data, and may account for migration prediction. In one example, the function estimates the UE's future location, and then projects a path loss for that location based on, for example, historical path loss, instantaneous data loads, projected network loading, current/future network configurations, etc. Thereafter, the method 2200 proceeds to step 2240, where the network device estimates the resource requirement of the UE's service session at the future instance in time. This estimation may be based on the estimated rate demand and the estimated spectral efficiency.

Thereafter, the method 2200 proceeds to step 2250, where the network device determines whether spectral efficiency correction is needed. This may include determining whether a difference between an actual spectral efficiency and the estimated spectral efficiency exceeds a threshold. If spectral efficiency correction is needed, the method 2200 proceeds to step 2260, where the network device updates a parameter of the prediction function to correct the error in the estimated spectral efficiency. The parameter may correspond to any one of a variety of components, such as the path-loss associated with a BIN, overall network interference, etc. After spectral efficiency correction is completed (or if it is not needed in the first place), the method 2200 reverts back to step 2210. In some embodiments, the prediction function and parameter adjustments may be applied iteratively until the estimated spectral efficiency falls within an accuracy range. In the same or other embodiments, the spectral efficiency may be estimated more frequently than rate demand (e.g., rate demand may be updated semi-statically).

Aspects of this disclosure provide the following rationale. If the actual amount of resources needed for HO traffic is below a reference curve in the past time windows, it is likely that the amount of resources needed in the near future will also be below a reference curve, since some of those HO traffic flows will sustain their services for a while. The same goes to the case where the actual amount of resources needed for HO traffic is above a reference curve in the past time windows.

Figure 23:
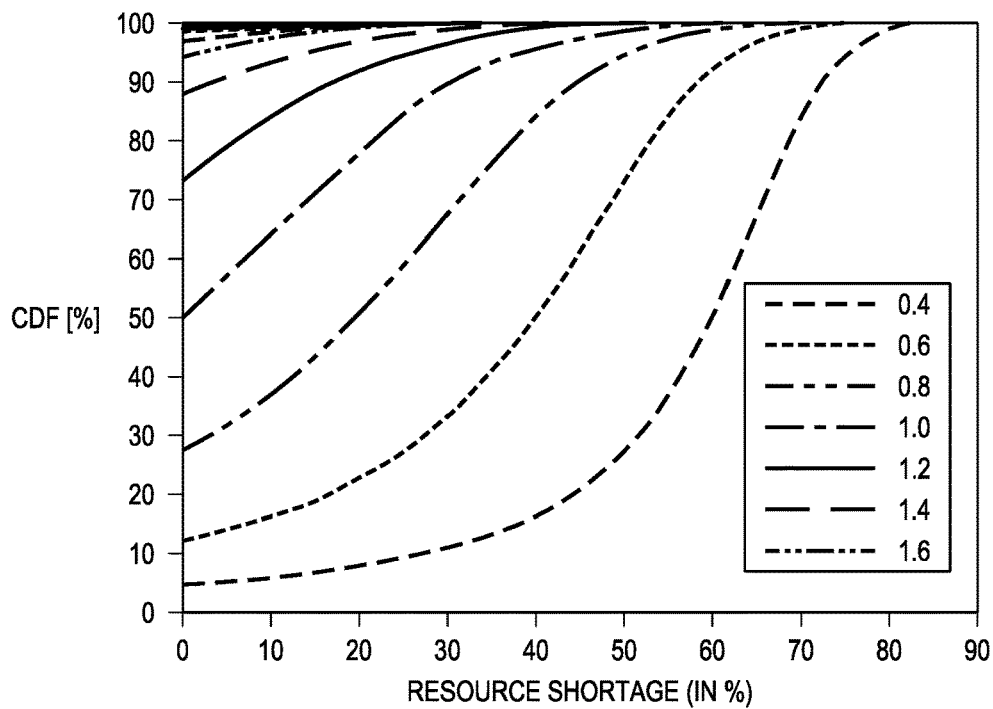
FIGS. 23-24 illustrate graphs of simulation results obtained from embodiment migration predictions techniques.
Figure 24:
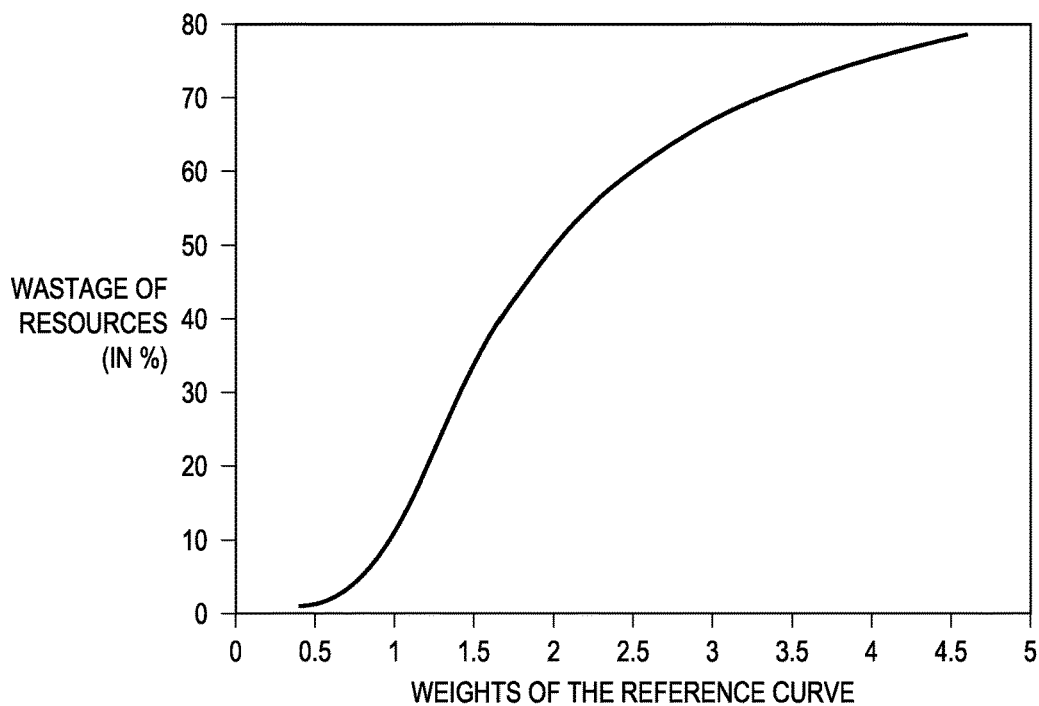
Figure 25:
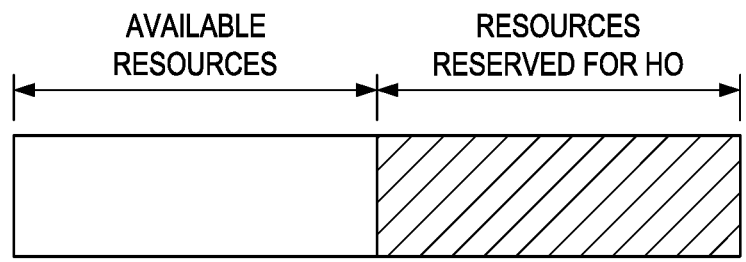
FIG. 25 illustrates a diagram of a bandwidth spectrum comprising a handover margin.

FIGS. 23 and 24 illustrate simulation results using a simulations setup outlined as follows: Topology=100 m×100 m; Center cell=a circle of radius 25 m at origin (o,o); Spectral efficiency=1/distance^2; UE mobility model=random waypoint; Effective bandwidth of each session=random variable; Session duration=random variable; Idle period=random variable; Simulation time=10000 seconds; Number of UEs=1000; Number of active UEs={200, 700, 1000, 200} for {[0 2500] [2501 5000] [5001 7500] [7501 1000]} seconds In the context of handover margins, the number of available resources (e.g., resources available for allocation) increases as the number of resources reserved for bandwidth traffic decrease. FIG. 25 illustrates a diagram of a bandwidth spectrum that is divided into available resources and resource reserved for handover traffic. Some schemes may statically reserve a certain amount of bandwidth for handover calls. Such schemes may assume that UE mobility is random and unpredictable, and may require no communication required among cells, thereby allowing the scheme to be easily implemented. However, such schemes may over-reserve resources and lead to higher than necessary call-blocking.

Figure 26:
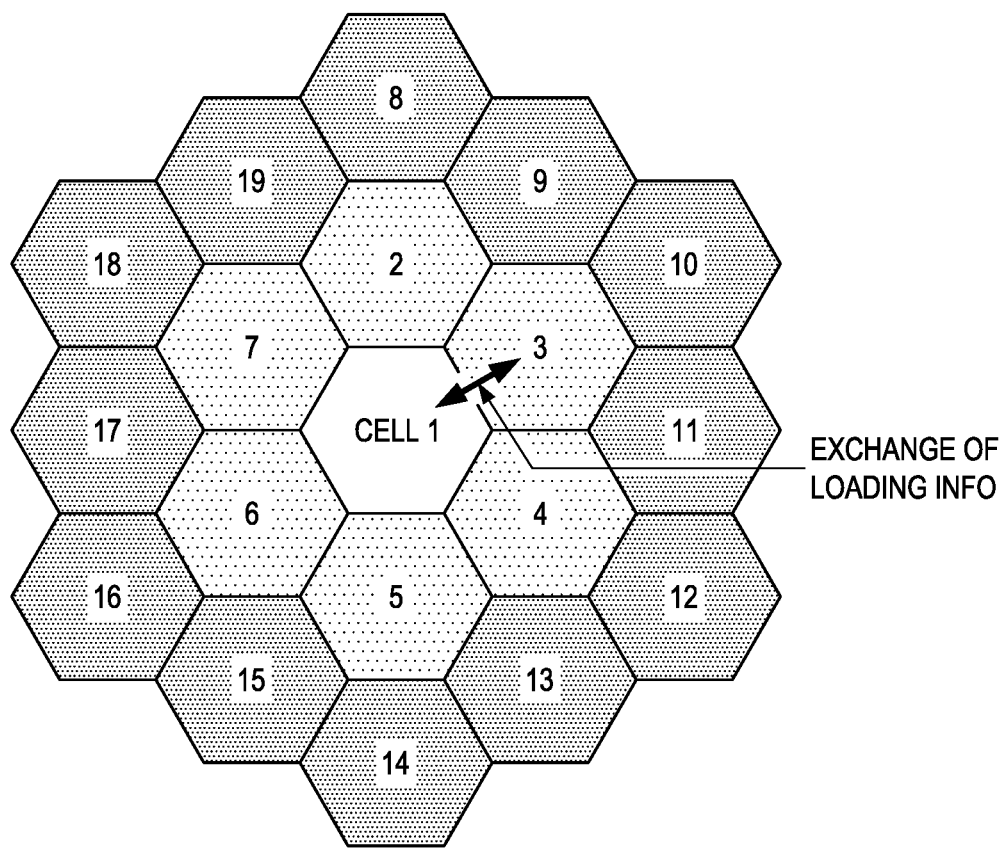
FIG. 26 illustrates a diagram demonstrating how loading data is exchanged in a network configured for shadow clustering.
Figure 27:
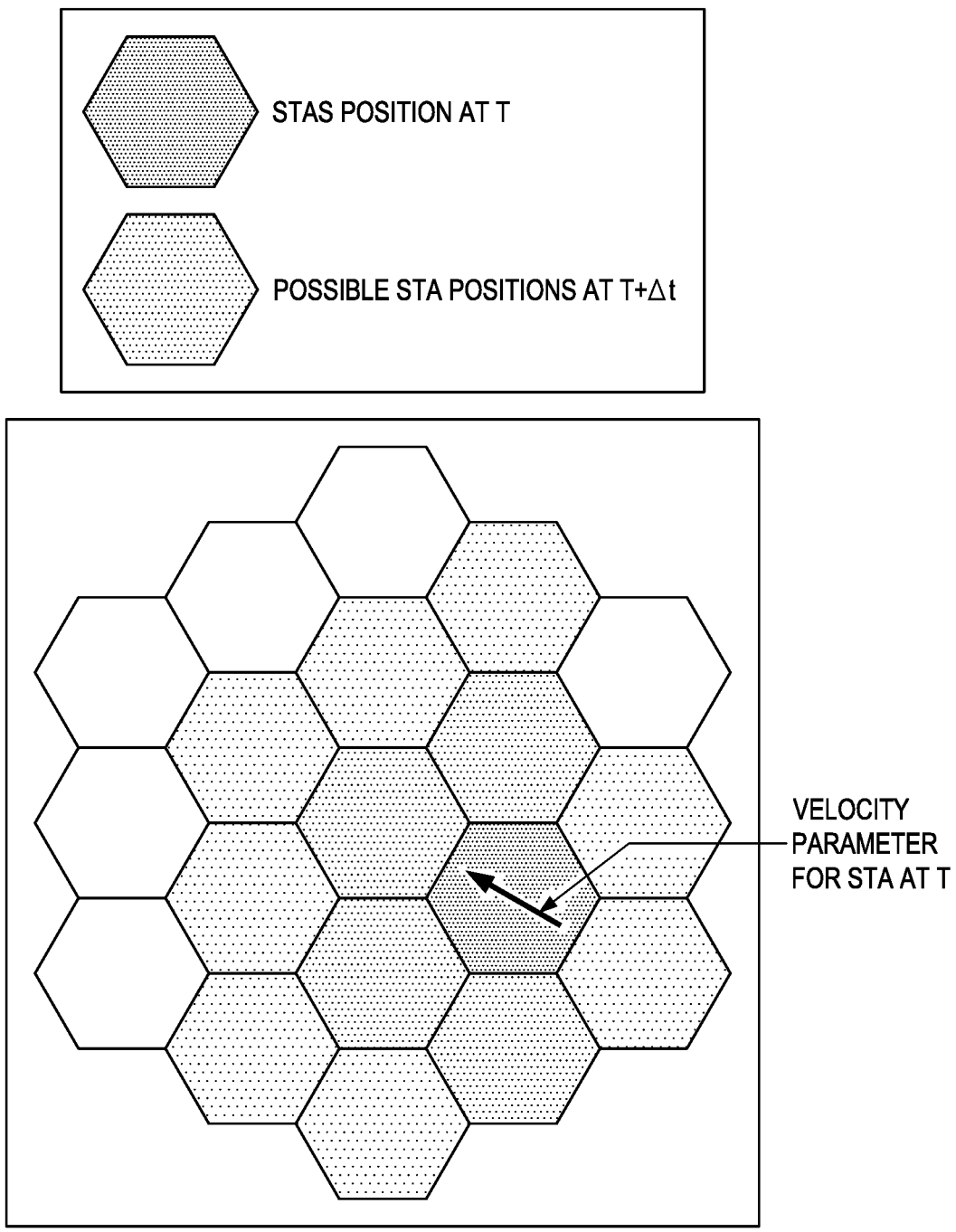
FIG. 27 illustrates a diagram of an embodiment technique for predicting future migration positions of a mobile station based on the mobile station's velocity.

Other schemes may rely on shadow clustering, which identifies a set of cells that a particular UE will likely traverse. Depending on the movement characteristics of a UE, different cells might have different weights since some cells are more likely to be crossed than the others. Loading information is exchanged. FIG. 26 illustrates a diagram demonstrating how loading data is exchanged in a network that utilizes shadow clustering. Such schemes can be improved through mobility predictions. FIG. 27 illustrates a diagram showing how a mobile station's velocity parameter at an instance time (T) can be used to predict possible migration positions at a future time (T+Δt).

In some embodiments, mobility prediction may account for variations in historical migrations over periodic or recurring periods. For instance, mobility parameters (e.g., velocity+BIN) may predict a different migration trajectory in the morning than in the evening, due to temporal fluctuations in historical migration patterns. By way of example, motor vehicles traveling over roadways may take different routes or paths in the morning than in the evening due to, inter alia, traffic congestion. In some embodiments, migration probability tables may associate specific migration patterns with specific user profiles to leverage the relative predictability of an individual user's schedule (e.g., John Doe may have established morning/evening commutes on workdays).

Figure 28A:
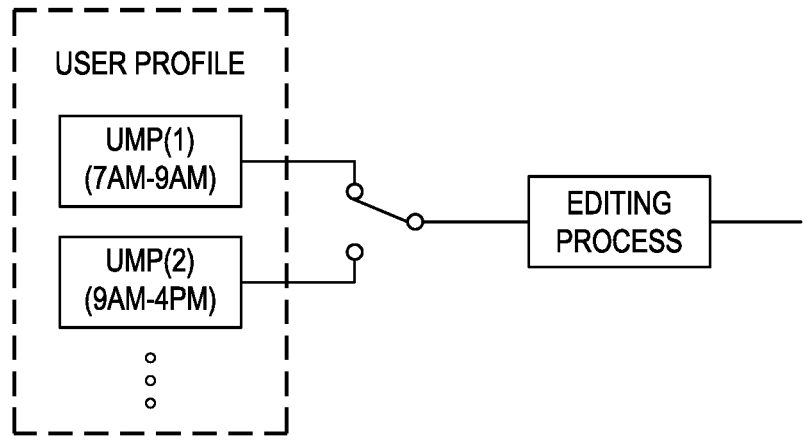
FIGS. 28A-28B illustrate diagrams of an embodiment migration probability table and corresponding migration patterns.
Figure 28B:
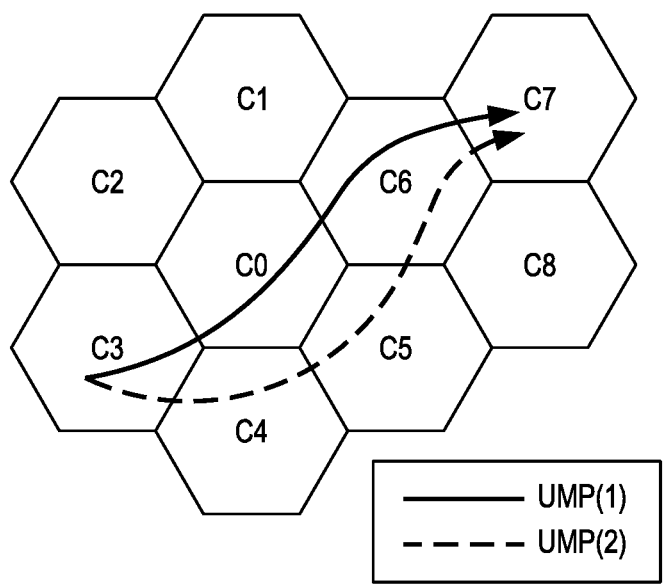

FIGS. 28A-28B show how specific migration patterns of an individual user can be modeled in a migration probability table.

Figure 30:
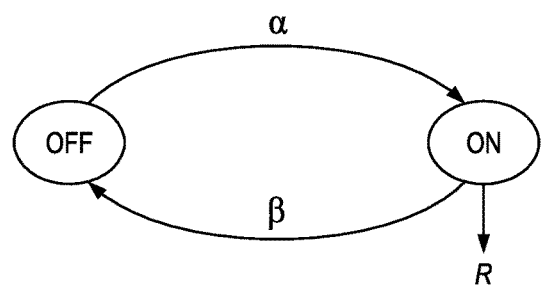
FIG. 30 illustrates a state diagram for adjusting prediction function parameters based on effective bandwidth.
Figure 31:
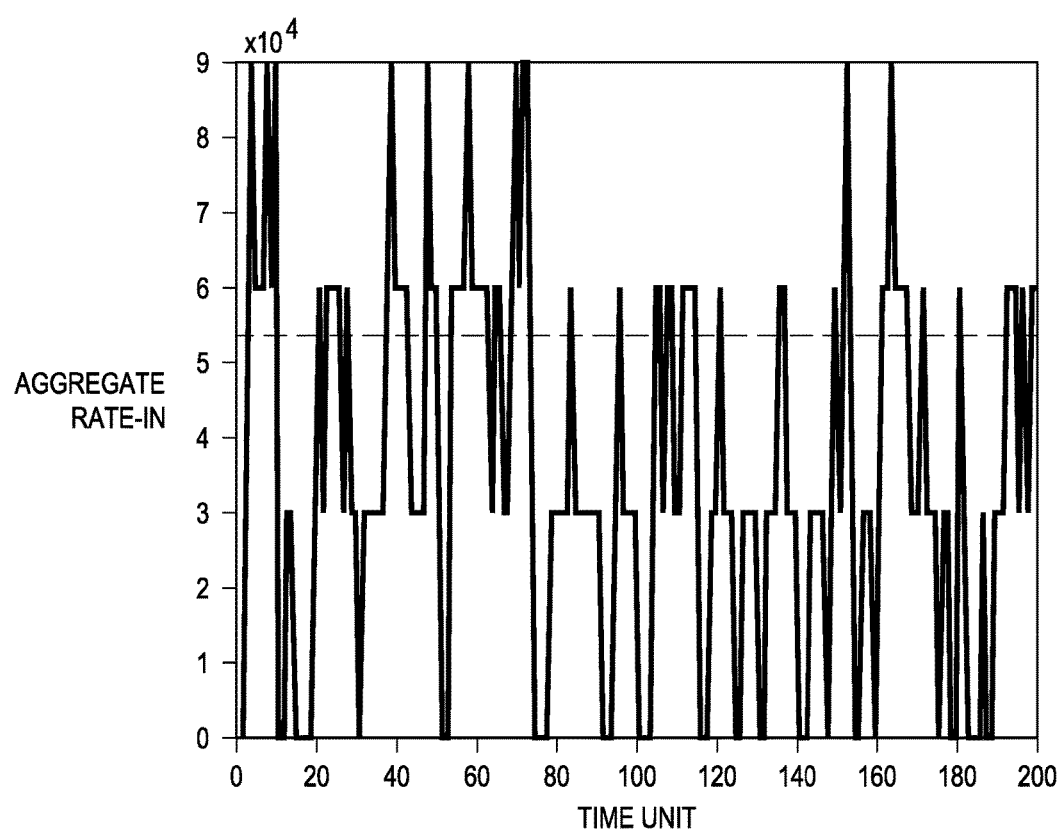
FIG. 31 illustrates a graph of bandwidth aggregation.
Figure 32:
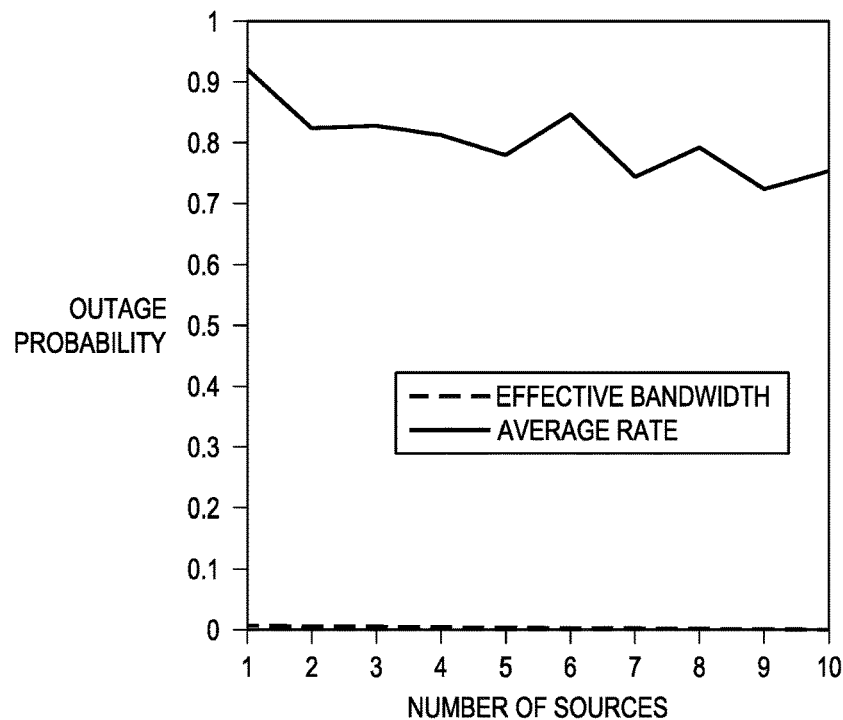
FIG. 32 illustrates a graph of outage probabilities for different numbers of sources.
Figure 33:
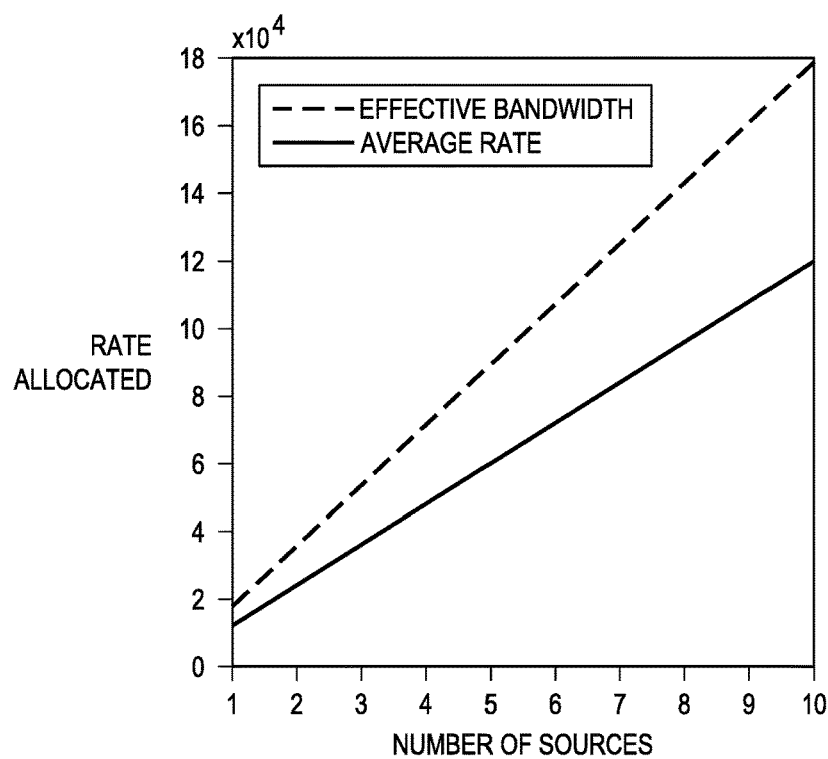
FIG. 33 illustrates a graph of allocated rates for different numbers of sources.

Mobility prediction techniques may allow for new resource allocation techniques to be implemented. FIG. 29 illustrates a table showing new allocation techniques for different traffic and prediction scenarios. FIG. 30 illustrates a state diagram for adjusting prediction function parameters based on effective bandwidth. FIG. 31 illustrates a graph of bandwidth aggregation. FIG. 32 illustrates a graph of outage probabilities for different numbers of sources. FIG. 33 illustrates a graph of allocated rates for different numbers of sources.

Figure 34:
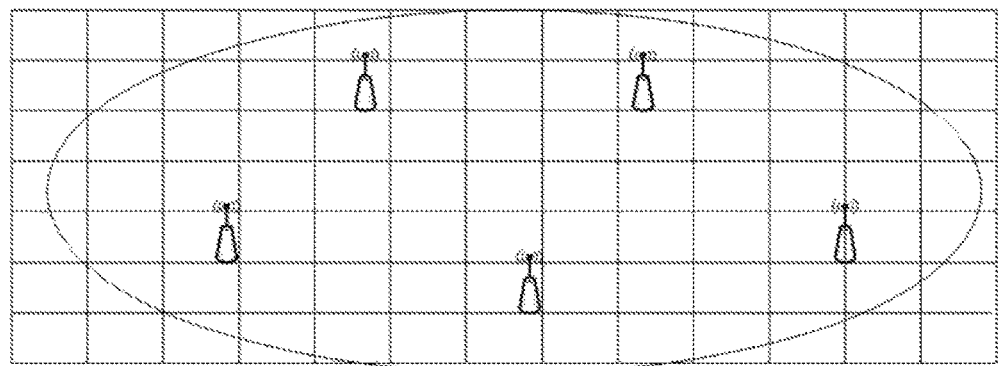
FIG. 34 illustrates a diagram of an embodiment network configured for per-bin geographical area partitioning.
Figure 35:
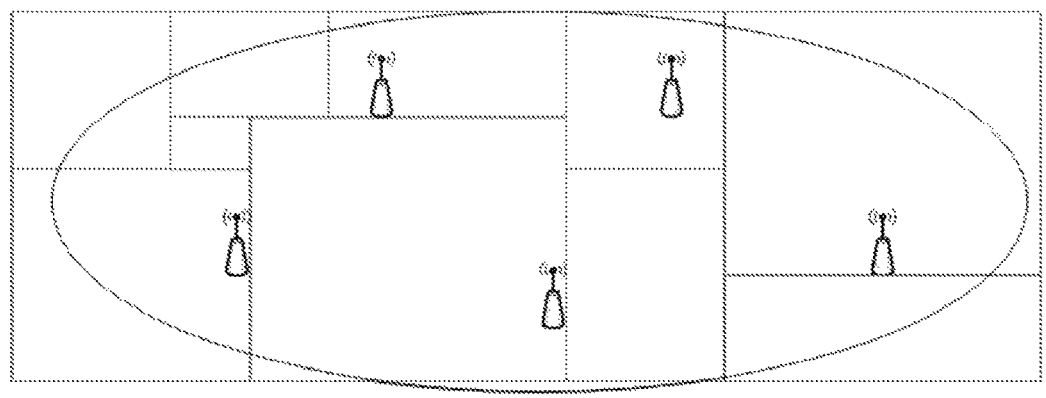
FIG. 35 illustrates a diagram of an embodiment network configured for per-zone geographical area partitioning.

Aspects of this disclosure provide techniques for predicting migration probabilities amongst geographic areas of a wireless network. In some embodiments, geographical areas may be further divided into a number of bins such a position of an object can be more precisely identified. For example, the accuracy of a GPS (e.g., a Garmin GPS, etc.) may be approximately 98.9% within a circular area having a 2.55m radius. Bin size can be determined in various ways. In one embodiment, an area zone per each segment of service duration is identified for a threshold level of mobility prediction accuracy. In another embodiment, a remaining system capacity for each (bin, time) tuple can be identified. The remaining system capacity may depend on the granularity of information, e.g., per bin per access node (physical or logical), per zone, per access node, per access node, per bin, per zone, etc. FIG. 34 illustrates a network configured for per-bin geographical area partitioning. FIG. 35 illustrates a network configured for per-zone geographical area partitioning. Evaluation of the remaining system capacity may depend on the accuracy of mobility prediction.

Figure 36:
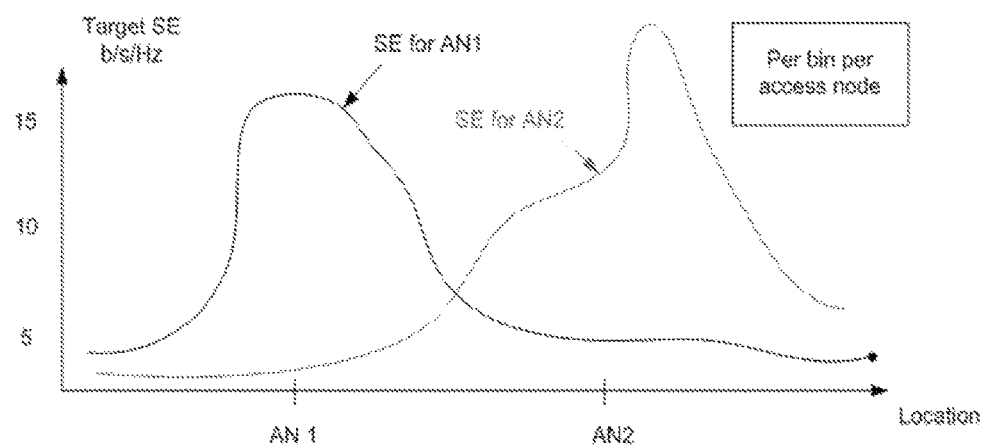
FIG. 36 illustrates a graph of a simulated system capacity evaluation on a per-bin-per-access node basis.

In some embodiments, the remaining "system capacity" can be evaluated on a per-bin-per-access-node basis, e.g., considering physical or logical cell association such as CoMP cell association. FIG. 36 illustrates a graph of a simulated system capacity evaluation on a per-bin-per-access node basis. At any given time, it may be possible to have knowledge of the "throughput" reserved or the number of resources reserved if SE is fixed for admitted users at any access node. One way to compute the remaining system capacity per bin is to fix the spectral efficiency (e.g., 95 percentile) with the number of available resources. Ideally, this would produce a precise spectral efficiency per bin, but it may not be available in the database. Instead, it may be useful to have a cumulative distribution function (CDF) of spectral efficiency per bin. This location-dependent spectral efficiency could be averaged over different access node associations, different numbers of UEs per access node, different configuration (e.g., PC, scheduling, IoT levels), different applications, or different times of day. Since the wireless channels are generally not independent from one time to another, it would be useful to have an autocorrelation function of spectral efficiencies or remaining throughput. This autocorrelation function may be used to predict the service outage probability when the duration of a requested service is short or when an admitted service is already in session.

Estimating resource usage per-bin-per-access node may be relatively accurate when UEs do not move or when there is relatively accurate mobility prediction, i.e., a vector of (location, time). In such cases, the admission control logic may check if the remaining capacity (e.g., target SE x available RB) at that UE location is larger than the required effective bandwidth. One potential downside to this scheme may be that the effectiveness of service admission is highly contingent on the accuracy of mobility prediction.

Figure 37:
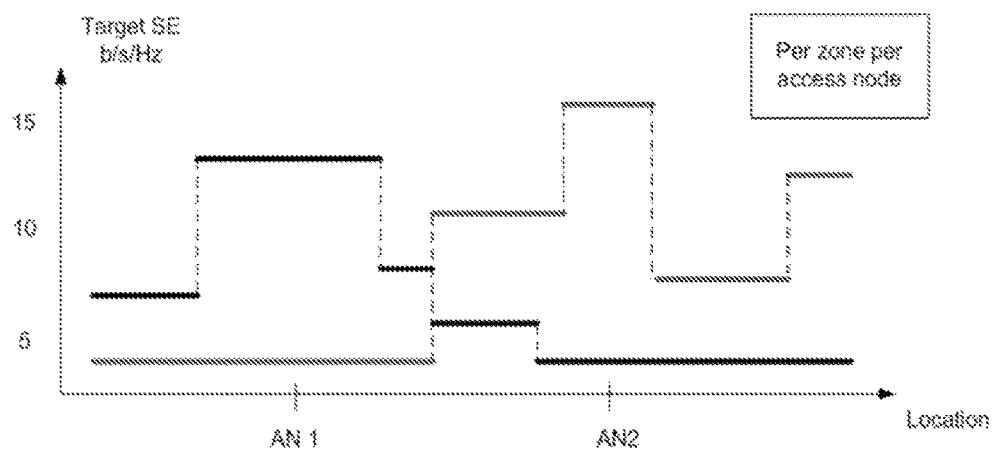
FIG. 37 illustrates a graph of a simulated system capacity evaluation on a per-bin-per-access node basis.

Another scheme may compute remaining "system capacity" on a per-zone-per-access-node basis (e.g., considering physical or CoMP cell association), which may offer reduced complexity when compared to other schemes as well as offer improved performance when mobility prediction is less accurate/timely. FIG. 37 illustrates a graph of a simulated system capacity evaluation on a per-zone-per-access-node basis. Once the remaining "system capacity" per bin per access node is known, it is possible to group several bins into a zone (e.g., of same or different sizes) based on UE mobility. In essence, this scheme enhances the accuracy of UE mobility prediction and allows the remaining system capacity to be evaluated for each zone per access node. This scheme may be beneficial when a UE exhibits rapid movement so long as mobility prediction is accurate within the coverage of each access node. The admission control logic may check if the remaining capacity per zone is larger than the required effective bandwidth prior to admitting a service request.

Figure 38:
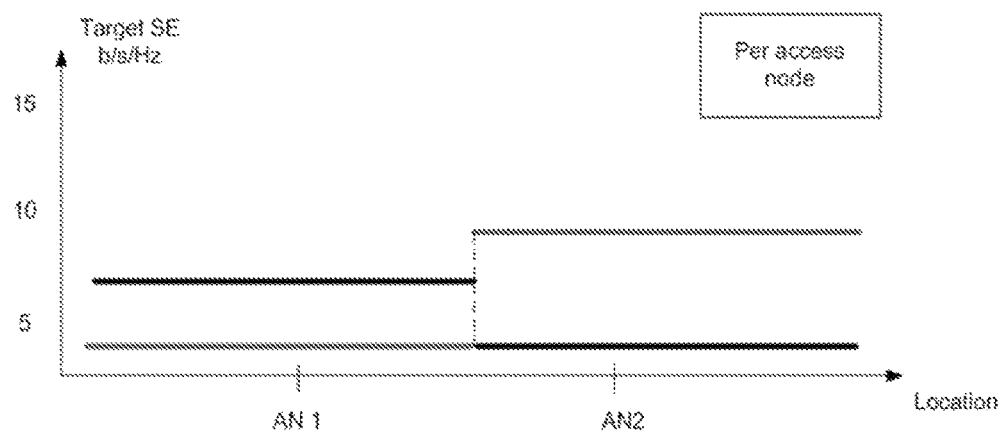
FIG. 38 illustrates a graph of a simulated system capacity evaluation on a per-access node basis.

In another approach, remaining "system capacity" can be evaluated on a per access node basis (e.g., considering physical or CoMP cell association). FIG. 38 illustrates a graph of a simulated system capacity evaluation on a per-access node basis. This may further reduce complexity. Once the remaining "system capacity" per bin per access node is obtained, it is possible to compute the remaining "system capacity" per access node. This scheme may offer good performance as long as there is accurate mobility prediction in terms of which access node(s) a UE will be connected to at any given time. The admission control unit may check if the remaining capacity is larger than the required effective bandwidth.

Since the system capacity is evaluated for the coverage area of an access node, the spectral efficiency or throughput CDF curves can be widespread, which can easily lead to conservative admission control. Thus, after admission, the system may continuously monitor the resource usage of the corresponding service and the mobility information of the corresponding UE.

Figure 39:
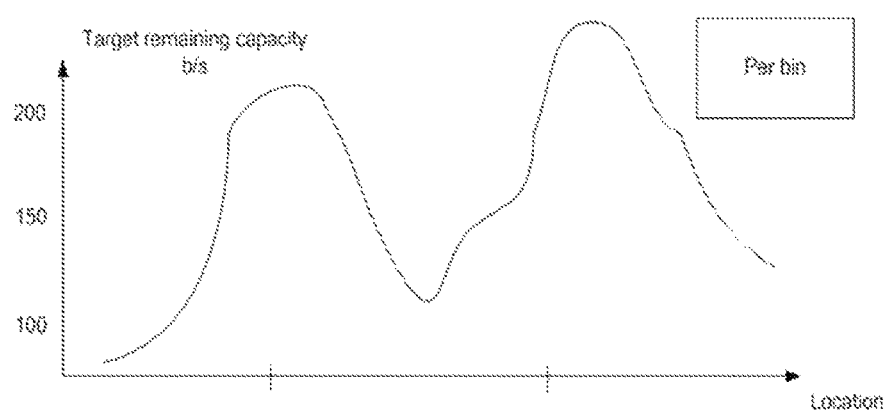
FIG. 39 illustrates a graph of a simulated system capacity evaluation on a per-bin basis.

Another scheme may compute remaining "system capacity" on a per-bin or per-zone basis (e.g., ignoring cell association) to achieve further complexity reduction. FIG. 39 illustrates a graph of a simulated system capacity evaluation on a per-bin basis. Once the remaining "system capacity" per bin is obtained, several bins can be grouped into one zone, and different zones can be of different sizes based on UE mobility. In the physical network, it is possible to obtain a CDF of remaining system capacity (i.e., available throughput) per each bin. When multiple SEs are available (e.g., with different cell associations), the CDF can be obtained by finding the maximum throughput available, e.g., max{SE1× RB1, SE2×RB2, . . . , SEn×RBn, SE_comp1×RB_comp1, . . . SE_compm×RB_compm}. Thus, in the end, it is possible to map end-to-end available throughput such that the admission control unit may check whether the remaining capacity is larger than the required effective bandwidth. This approach essentially decouples the task of service admission from the task of resource allocation, and the admission control unit determines if the system can support the service, while a NETWORK-layer and MAC-layer resource manager determines how resources should be allocated. The resource allocation pattern can be reported back to the admission control to keep a record of how resources should be reserved and how remaining system capacity should be calculated for the next coming service request. Or, the admission control can also assume a certain resource allocation algorithm, e.g., load balancing would be done via routing, equal resource allocation, shortest path, WiFi-first, lowest cost, etc.

Aspects of this disclosure allow system capacity to be calculated for multi-path routing. When multi-path routing is enabled, different packets can be sent via different links simultaneously, e.g., odd (even-)numbered packets are routed through access node 1 (access node 2). To compute the maximum available capacity at a particular location assuming single-hop links, an optimization problem can be formulated as follows: (1) minimize $\{\sum_{m=1}^{M} x_m\}$; (2) $\sum_{m=1}^{M} x_m \leq B$; (3) $0 \leq x_m \leq b_m$, $\forall m$; (4) $\sum_{m=1}^{M} SE_m x_m \geq \gamma$, where B is the total number of resources (e.g., RBs) that can be used for packet transmission, $b_m$ is the available number of resources at access node m, $SE_m$ is the target SE of access node m, $\gamma$ is the effective bandwidth of this UE, and $x_m$ is the decision variable of the amount of resources access node m should allocate to this UE. The objective function may be used to minimize the total amount of wasted resources. This problem may be simplified as follows: (1) Set $x_m=0$ for all m; (2) Find the access node m* where $SE_m$* is the maximum; there is no access node in the list, stop; (3) Check if there is any resource available at access node m*, if yes, then set $x_{m*}=x_{m*}+1$, if no, remove access node m* and revert to step two; (4) Check if the required effective bandwidth is satisfied, if satisfied, stop, if not satisfied, go back to step two.

A load-aware algorithm can be given as follows: (1) Set $x_m=0$ for all m, and add all the potential access nodes to the list; (2) Find the access node m* where $b_{m*}$ (or $SE_{m*}b_{m*}$) is the maximum; if there is no access node in the list, stop; (3) Check if there is any resource available at access node m*, i.e., $x_{m*}<b_{m*}$, if yes, set $x_{m*}=x_{m*}+1$, if no, remove access node m* from the list and go back to step two; (4)check if the required effective bandwidth is satisfied, if satisfied, stop, if not satisfied, go back to step two.

Aspects of this disclosure allow for the calculation of system for random medium access control such as 802.11, where the system capacity primarily depends on the MAC protocol and how many users compete for the resources in a distributed manner. One way to compute a remaining system capacity is given as follows: (1) Obtain a data rate available per location from past historical data; (2) Obtain the number of STAs connecting to each access node; (3) Remaining system capacity of an access node=f(data rate, overhead, number of STAs, MAC protocol, priority). In random access MAC, adding a new traffic source in the system will decrease a resource share of each admitted source in the system. Besides computing the system capacity available for the incoming user, it may also be helpful to evaluate if the QoS requirements of the already admitted users can be met by adding this new user. Aspects of this disclosure allow for usage of adaptive area partitioning. Generally, mobility prediction and UE behavior prediction may have some degree of inaccuracy, so it may be inadvisable to reserve resources beyond the access nodes currently serving a UE (unless we have 100% accuracy on mobility prediction and UE behavior prediction). Thus, the home cell currently serving a UE tries to perform area partitioning based on mobility prediction and reserves resources accordingly. When this UE is handed over to another cell, this cell would try to perform area partitioning based on mobility prediction and reserves resources accordingly.

Figure 40:
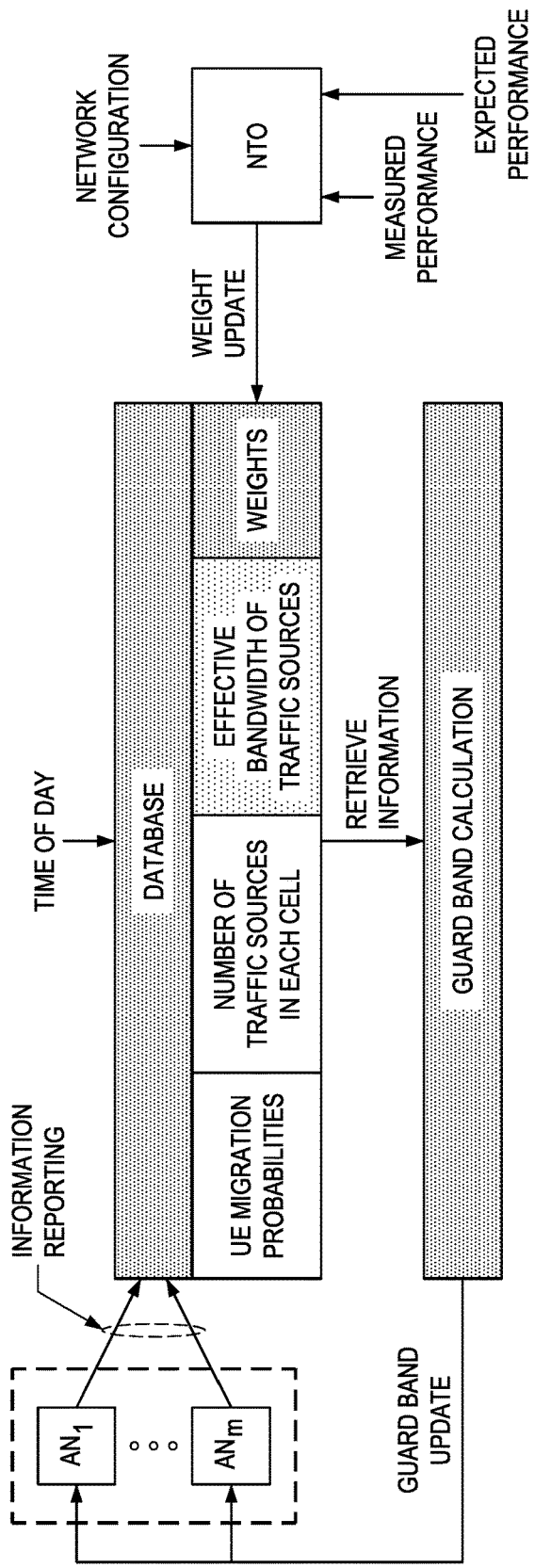
FIG. 40 illustrates a diagram of an embodiment device for computing handover margins.

Aspects of this disclosure provide adaptive guard band techniques that utilize migration probability predictions. FIG. 40 illustrates an apparatus configured to compute handover margins (or guard bands). In embodiments, neighboring access nodes may exchange long-term statistics and/or instantaneous information to facilitate mobility prediction. This information may include probabilities that a UE of a certain traffic class will go from access node A to access node B. The following equation can be used to compute handover margins at access node k at time t: $\Theta_k = \sum_{m \neq k} a_{mk}(t) \sum_{j=1}^{J} r_{m,j}^{eff} N_{m,j}(t) P_{mk,j}(t)$, where $P_{mk,j}(t)$ is the probability that a UE of traffic class j moves from access node m to access node k at time t, $N_{m,j}(t)$ is the "number of UEs" (e.g., average, estimated, instantaneous) of traffic class j in access node m at time t, $r_{m,j}^{eff}$ is the estimated effective bandwidth of traffic class j in access node m, and $a_{mk}(t)$ is the weighting factor for the aggregate effective bandwidth for access node m to access node k at time t.

Another guard band design is described as follows: 1) dynamic guard bands are computed based on offline historical data, which saves a lot of online signalling overhead; and 2) no information exchange among access nodes is needed for guard band computation. The basic steps of the proposed solution can be summarized as follows: For each access node in each given time window, (1) Identify the traffic of each handover (HO) UE from other access nodes, and estimate the effective bandwidth of that traffic; (2) Sum up the effective bandwidths of all the HO UEs and store them in a database; and (3) compute a guard band based on an HO outage rate, an affordable data rate, an expected spectral efficiency, etc.

Figure 41:
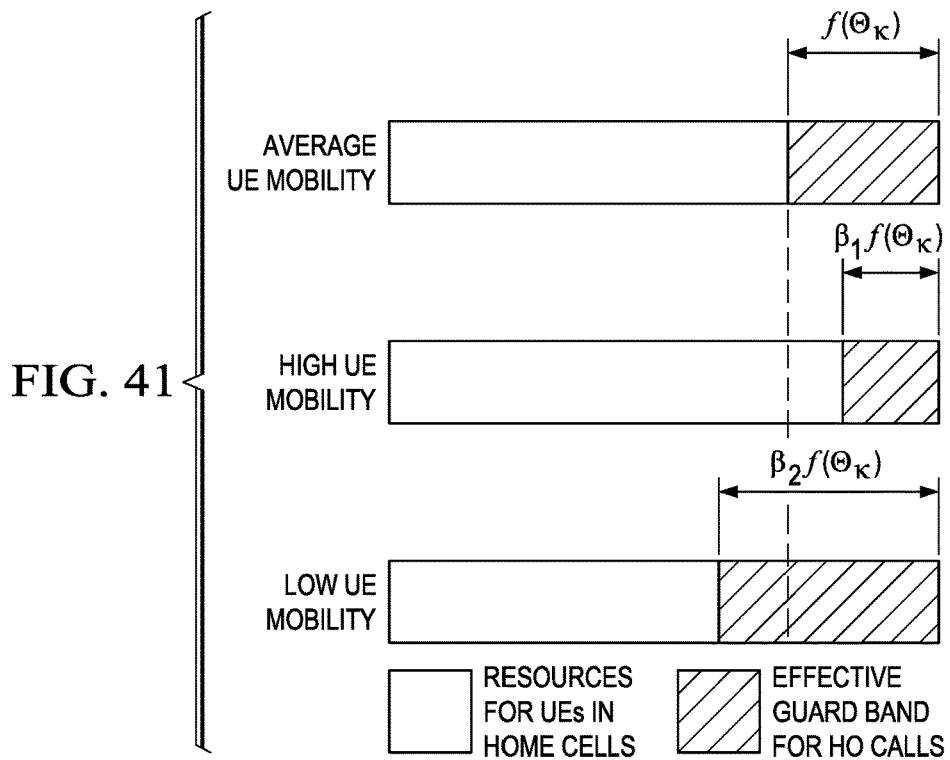
FIG. 41 illustrates a diagram depicting different guard band configurations for different levels of UE mobility.

Referring back to FIG. 19, the guard band threshold(s) depicted can be used for UEs with "average" mobility (to be identified through training or background simulations). We should set different guard band thresholds for different UE speeds as follows: $\beta f(\Theta_k)$, where f(.) is a function mapping the throughput (bit/s) into the number of resources (in Hz), $$0 \leq \beta \leq \frac{B}{f(\Theta_k)}$$

and B is the total number of resources. So, when a UE sends a request to its home cell together with the speed profile of this UE (e.g., obtained from a UE profile database), the home cell computes the effective guard band and evaluates if it has enough resources to admit this service. For example, when a UE moves faster than an average UE, the amount of resources needed for a home cell to serve this UE over certain duration is less. In other words, the "effective guard band" of this home cell is relatively smaller, since this UE will soon be handed over to another cell. In turn, the home cell is able to admit more services. FIG. 41 depicts different guard band configurations for different levels of UE mobility.

Figure 42:
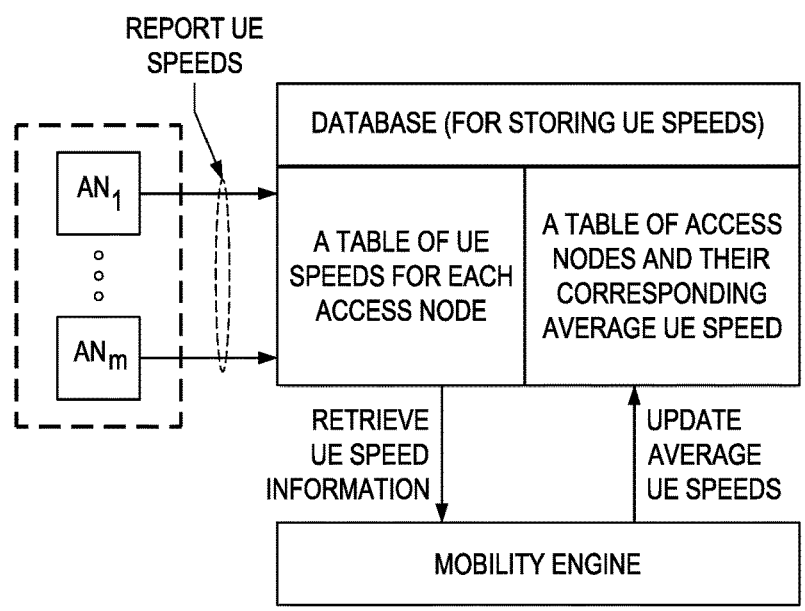
FIG. 42 illustrates a diagram of an embodiment system for computing guard bands.

The following steps can be used to compute effective guard bands: (1) Compute average UE speed at each access node [(a) Each access node reports UE speeds to a database from time to time, (b) A mobility engine retrieves the UE speed information and computes an average UE speed for each access node for a time window (e.g., morning, afternoon, evening), and reports the average speeds back to the database]; (2) Compute an effective guard band for an incoming request [(a)The home cell requests the mobility information of this UE from a database storing UE mobility profiles, (b)The home cell retrieves its average UE speed from the database storing the average UE speed at each access node]. FIG. 42 illustrates an embodiment system for computing guard bands.

Figure 43:
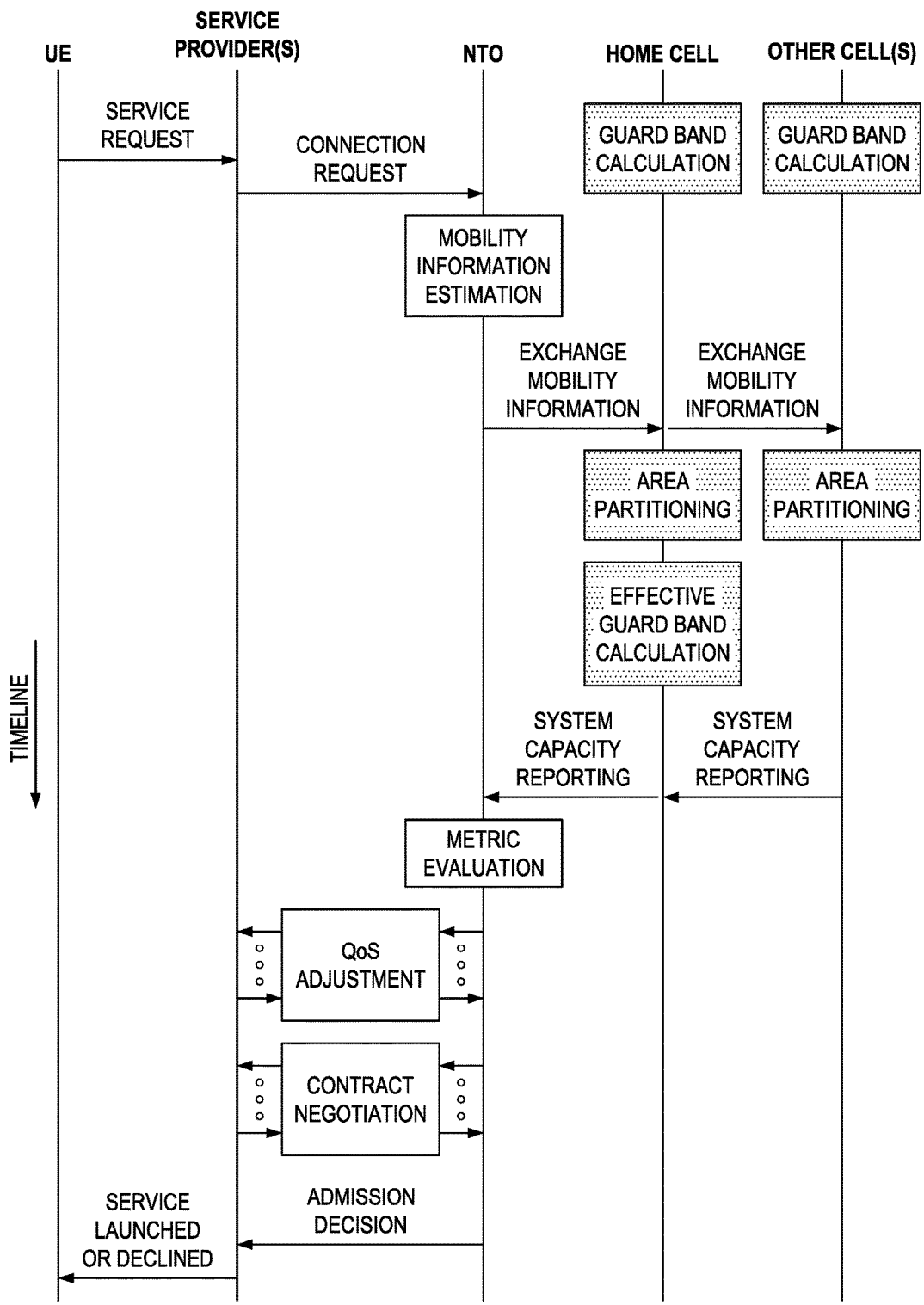
FIG. 43 illustrates a protocol diagram of an embodiment communications sequence for partitioning coverage areas and adjusting guard bands.

Aspects of this disclosure allow adaptive area partitioning techniques and adaptive guard band adjustment techniques to be combined. FIG. 43 illustrates a communications sequence for partitioning coverage areas and adjusting guard bands. The following is a description of that sequence: (a) Each cell exchanges parameters (such as UE migration probabilities, loading, traffic characteristics, weights, etc.) that are used to compute a guard band. The guard band calculation can also be performed by an NTO. (b) When a service request arrives, a service provider will send a connectivity request to an NTO or connectivity-as-a-service provider (CaaSP). (c) An NTO will try to look up the mobility profile of this UE and exchanges the information with the access nodes of interest, e.g., a home cell and its neighboring cells. (d) Should the mobility of this UE be somewhat predicted, the home cell will perform geographical area partitioning according to the provided UE mobility profile [(i) If the mobility and UE behavioral can be perfectly predicted, each of the involved access nodes will perform geographical area partitioning and reserve resources accordingly, (ii) In the case of no mobility prediction, the step of geographical area partitioning can be skipped]. (e) The home cell will determine its "effective guard band" based on the UE mobility information, if feasible. If an effective guard band cannot be estimated, the home cell will not modify its guard band. (f) With the amount of guard bands determined, each cell computes the remaining system available per area (per access node) according to the decision of geographical area partitioning. (g) The NTO will check if the system has enough capacity to satisfy the QoS requirements of this service request. (h) QoS and contract negotiations can be triggered between the service provider and the NTO. (i) An admission decision is issued to the service provider, and the corresponding service can be launched or declined.

Figure 44:
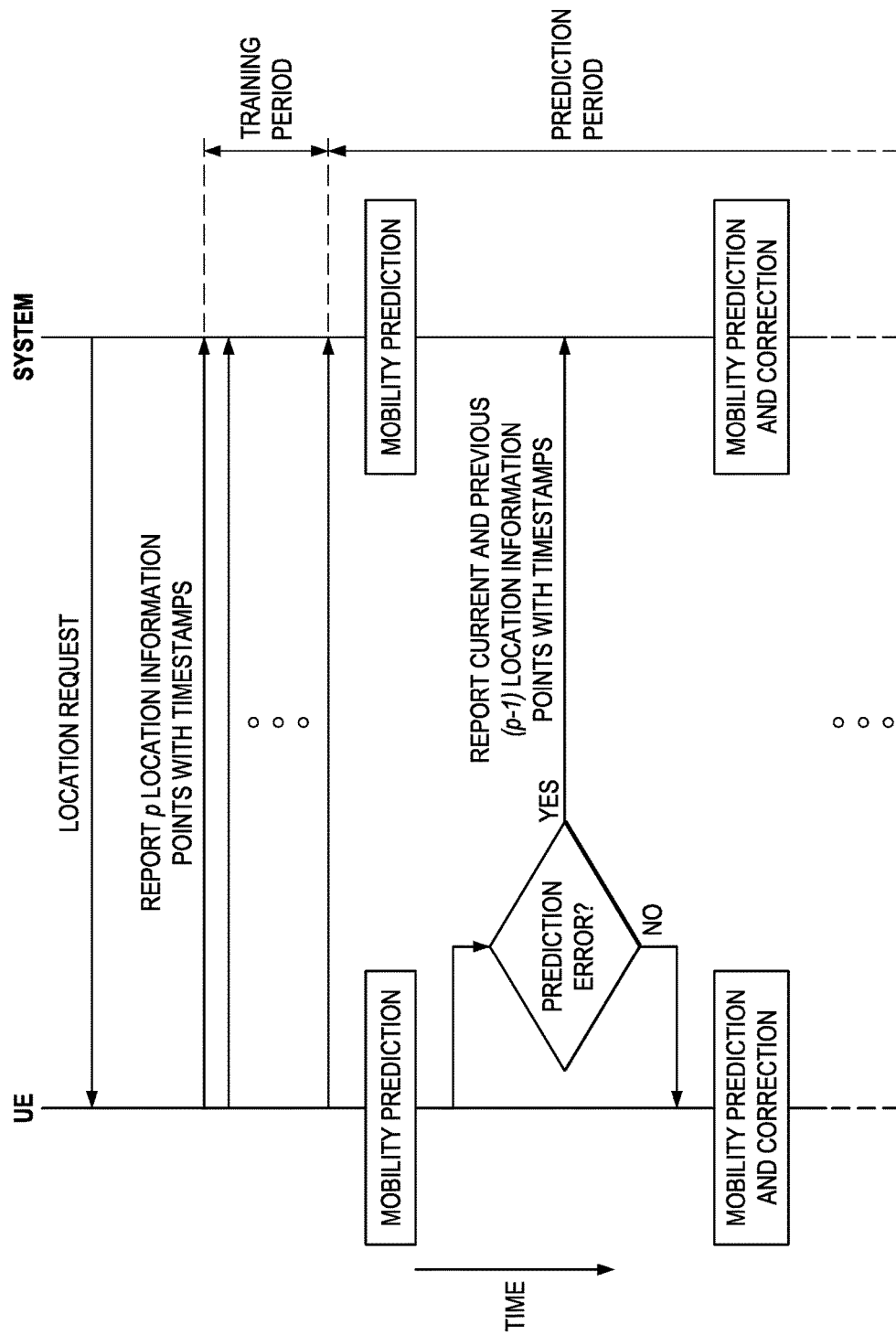
FIG. 44 illustrates a protocol diagram of an embodiment communications sequence for achieving mobility prediction.

After admitting UEs, operators may continue to monitor and estimate the movement of each UE. The rationale for this is that the amount of resources needed for those admitted services can be computed more accurately. The following approach can be used to predict UE mobility based on an auto-regressive (AR) model: Set a duration of a training phase; During the training phase, a UE keeps a record of its (GPS location, time) entry at a regular or any pre-defined time interval; The UE can either report its (GPS location, time) entry every time or report a list of (GPS location, time) entries all at once at the end of the training phase to a mobility predictor; At the end of the training period, both the UE and the mobility predictor have the same sets of (GPS location, time) entries, and they both run the same mobility prediction algorithm in parallel. One algorithm under consideration is based on AR; At any time after the training period, if the difference between an actual (location, time) entry and an estimated (location, time) entry is less than a threshold, no reporting is necessary, and the mobility predictor can assume that a predicted (location, time) is accurate. Both the UE and the mobility predictor continue to run the mobility prediction algorithm in parallel; If the difference between an actual (location, time) entry and an estimated (location, time) entry is larger than a threshold, a UE will report the actual (location, time) entry to the mobility predictor. Both the UE and the mobility predictor use the updated inputs to continue to perform mobility prediction in parallel. FIG. 44 illustrates a protocol diagram of an embodiment communications sequence for achieving mobility prediction.

A simplified AR model for mobility prediction is as follows: $\tilde{z}_k = c + \Sigma_{i=1}^{P} \varnothing_i z_{k-i}$, where p is the order of the AR model, $z_j$ is the actual $j^{th}$ observation, $\tilde{z}_k$ is the estimated $k^{th}$ observation, $\varnothing_i$ 1 is the $i^{th}$ coefficient of the AR model, and c is a constant. Denote the estimation error $e_k = z_k - \tilde{z}_k$. A mobility predictor can be built as follows: Initialize all the AR coefficients:

$$\varnothing_j = \frac{w_j}{p},$$

for j=1,2, . . . , p, where $\Sigma_{i=1}^{P} \varnothing_i = 1$ and $w_j \geq 0$, for j=1,2, . . . , p; Update the coefficients starting from j=1 to j=p:

$$\tilde{\varnothing}_j = \frac{1}{z_{k-j}} \left( z_k - \frac{je_k}{p+1} - \Sigma_{i=1}^{j-1} \tilde{\varnothing}_i z_{k-i} - \Sigma_{i=j+1}^{p} \varnothing_i z_{k-i} \right);$$

Update the constant c: $c = z_k - \Sigma_{i=1}^{P} \tilde{\varnothing}_i z_{k-i}$.

This predictor can be used to predict the speed and direction of a UE. Given two sets of xy-coordinates, it is possible to compute the speed and the direction as follows. Denote $\theta_i$ as the direction, $s_i$ is the speed at time slot I, and T is the duration spent travelling. Thus, $$\theta_i = \begin{cases} \arctan\left(\frac{y_i - y_{i-1}}{x_i - x_{i-1}}\right) & \text{if } x_i > x_{i-1} \\ \arctan\left(\frac{y_i - y_{i-1}}{x_i - x_{i-1}}\right) + \pi & \text{if } x_i < x_{i-1} \\ \frac{1}{2}\pi & \text{if } x_i = x_{i-1} \ \& \ y_i > y_{i-1} \\ -\frac{1}{2}\pi & \text{if } x_i = x_{i-1} \ \& \ y_i \leq y_{i-1} \end{cases}$$

$$s_i = \sqrt{(x_i - x_{i-1})^2 + (y_i - y_{i-1})^2}$$

It is then possible to estimate both the direction and the speed at time slot i=1, $\tilde{\theta}_{i+1}$ and $\tilde{s}_{i+1}$, respectively, using the proposed AR model. Notice that a standard continuous transformation is applied on the direction. With the estimates, xy-coordinates can be predicted as follows: $\tilde{x}_{i+1} = x_i + \tilde{s}_{i+1}\cos(\tilde{\theta}_{i+1})$; $\tilde{y}_{i+1} = y_i + \tilde{s}_{i+1}\sin(\tilde{\theta}_{i+1})$.

Aspects of this disclosure allow adaptive guard bands to be predicted in real-time (e.g., online, on-the-fly, etc.). This may be achieved by employing the mobility information of the admitted active users to compute guard bands at any given time t>o (in the future). Below is the brief description of how to leverage the mobility information of the active users: Assign a probability for each zone that an active UE could be located at time t>o; For each cell, compute average resources needed if UEs in other cells will hand over to this cell time t>o, and determine the amount of guard bands needed at time t>o; Repeat the steps at the next pre-defined time. In order to determine that probability, a similar AR mobility prediction model can be used. It is possible to determine the probability for each zone that an active UE could be located at time t based on the estimation error. Since the online approach might be an over-estimate or an under-estimate, it may be useful to combine the offline guard band calculation and the online guard band calculation. One way is to use a linear weighted average: Guard band at time t=alpha x online guard band at time t+(1-alpha)x offline guard band at time t.

Figure 45:
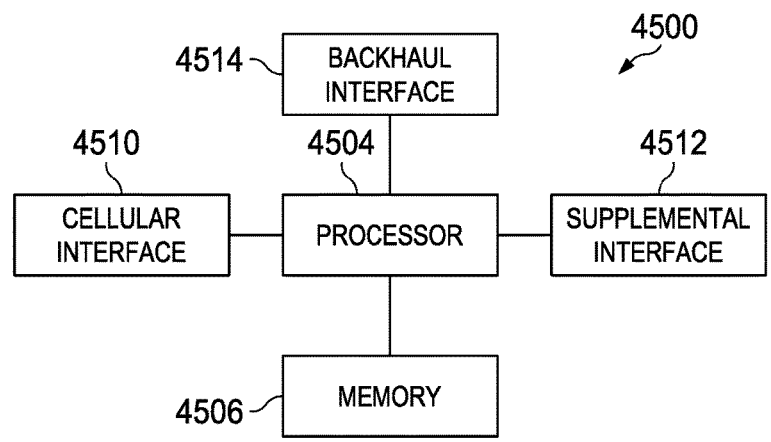
FIG. 45 illustrates a block diagram of an embodiment communications device.

FIG. 45 illustrates a block diagram of an embodiment of a communications device 4500, which may be equivalent to one or more devices (e.g., UEs, NBs, etc.) discussed above. The communications device 4500 may include a processor 4504, a memory 4506, a cellular interface 4510, a supplemental interface 4512, and a backhaul interface 4514, which may (or may not) be arranged as shown in FIG. 45. The processor 4504 may be any component capable of performing computations and/or other processing related tasks, and the memory 4506 may be any component capable of storing programming and/or instructions for the processor 4504. The cellular interface 4510 may be any component or collection of components that allows the communications device 4500 to communicate using a cellular signal, and may be used to receive and/or transmit information over a cellular connection of a cellular network. The supplemental interface 4512 may be any component or collection of components that allows the communications device 4500 to communicate data or control information via a supplemental protocol. For instance, the supplemental interface 4512 may be a non-cellular wireless interface for communicating in accordance with a Wireless-Fidelity (Wi-Fi) or Bluetooth protocol. Alternatively, the supplemental interface 4512 may be a wireline interface. The backhaul interface 4514 may be optionally included in the communications device 4500, and may comprise any component or collection of components that allows the communications device 4500 to communicate with another device via a backhaul network.

Figure 46:
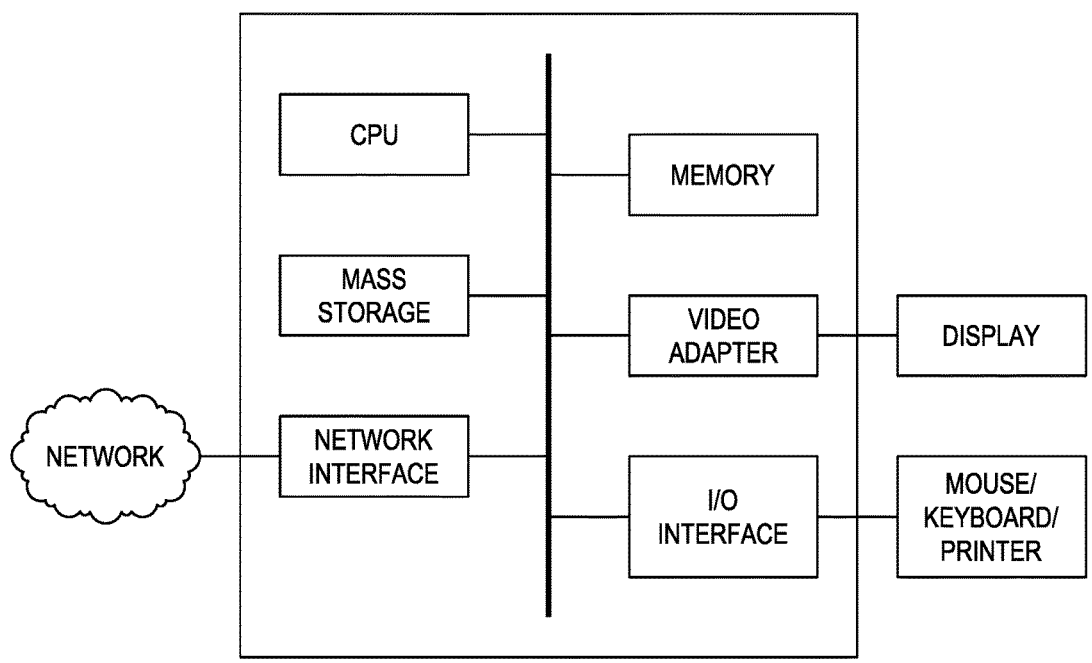
FIG. 46 illustrates a block diagram of an embodiment processing system.

FIG. 46 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. For example, when there are cooperative transmissions, the percentage of traffic for each path need to be used when evaluating the resource cost for a given service. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving, by a radio access network (RAN) device, a migration probability table from a network component in a core network, the migration probability table specifying probabilities that mobile stations having certain mobility parameters will migrate from a first bin to a second bin of multiple bins served by an access point over one or more fixed time periods, the probabilities determined based on gathered bin-based statistical information for the access point;
for each mobile station currently located in one of the multiple bins served by the access point:
obtaining at least one current mobility parameter for the each mobile station;
estimating migration probability information for the each mobile station based on the at least one current mobility parameter for the each mobile station and the migration probability table;
estimating, by the RAN device, an aggregate network resource usage of the access point during a future period based on the estimated migration probability information of all the mobile stations currently located in one of multiple bins served by the access point; and
admitting one or more new user sessions to the access point based on the estimated aggregate network resource usage.

2. The method of claim 1, wherein the aggregate network resource usage is estimated based on the migration probability information comprising an access point assignment probability for each bin.

3. The method of claim 1, wherein the aggregate network resource usage is estimated based on the migration probability information and a resource usage for each bin as a function of neighbor access point load.

4. The method of claim 3, wherein the resource usage from each access point for a given bin of the multiple bins is obtained based on the migration probability table.

5. The method of claim 1, wherein the mobility parameters of the each mobile station comprise a specified velocity for the each mobile station, and wherein the migration probability information indicates a probability that the each mobile station will migrate from the first bin and the second bin of the multiple bins served by the access point before an end of the future period.

6. The method of claim 1, wherein the estimating comprises:
   determining an expected resource usage of the aggregate network resource usage according to a current user distribution.

7. The method of claim 1, wherein the admitting comprises:
   admitting the one or more new user sessions to the access point when an estimated amount of available resources of the access point exceeds the estimated aggregate network resource usage of the access point during a future period by more than a threshold; or
   rejecting the one or more new user sessions to the access point when the estimated amount of available resources of the access point does not exceed the estimated aggregate network resource usage of the access point during the future period by more than the threshold.

8. The method of claim 1, wherein the migration probability information specifies a user profile of the each mobile station, and wherein the user profile indicates historical migration information that is unique to the each mobile station.

9. The method of claim 1, wherein the aggregate network resource usage is estimated based on the migration probability information related to mobile stations in the access point and adjacent access points and a current network load.

10. The method of claim 1, wherein the migration probability information for the each mobile station comprising access assignment probability that each mobile station served by the access point under a particular loading condition of the access point.

11. The method of claim 10, wherein the access assignment probability is based on the mobility parameters of the each mobile station served by the access point, the access assignment probability being gathered during a previous period.

12. A radio access network (RAN) device comprising:
    a processor; and
    a non-transitory computer readable storage medium storing programming for execution by the processor, the programming including instructions to:
      receive a migration probability table from a network component in a core network, the migration probability table specifying probabilities that mobile stations having certain mobility parameters will migrate from a first bin to a second bin of multiple bins served by an access point over one or more fixed time periods, the probabilities determined based on gathered bin-based statistical information for the access point;
      for each mobile station currently located in one bin of the multiple bins severed by the access point:
        obtain at least one current mobility parameter for the each mobile station;
        estimate migration probability information for the each mobile station based on the at least one current mobility parameter for the each mobile station and the migration probability table;
      estimate an aggregate network resource usage of the access point during a future period based on the estimated migration information of all the mobile stations currently located in one of the multiple bins served by the access point; and
      admit one or more new user sessions based on the estimated aggregate network resource usage.

13. The RAN device of claim 12, wherein the mobility parameters of the each mobile station comprise a specified velocity for the each mobile station, and wherein the migration probability information indicates a probability that the each mobile station will migrate from the first bin to the second bin of the multiple bins served by the access point before an end of the future period.

14. The RAN device of claim 12, wherein the instructions to estimate the aggregate network resource usage in the multiple bins include instructions to:
    determine an expected resource usage of the aggregate network resource usage according to a current user distribution.

15. The RAN device of claim 12, wherein the instructions to admit new user sessions to the access point based on the aggregate network resource usage includes instructions to:
    admit the one or more new user sessions to the access point when an estimated amount of available resources of the access point exceeds the estimated aggregate network resource usage of the access point during the future period by more than a threshold; or
    reject the one or more new user sessions to the access point when the estimated amount of available resources of the access point does not exceed the estimated aggregate network resource usage of the access point during the future period by more than the threshold.

16. The RAN device of claim 12, wherein the migration probability information specifies a user profile of the each mobile station, and wherein the user profile indicates historical migration information that is unique to the each mobile station.

17. The RAN device of claim 12, wherein the aggregate network resource usage is estimated based on the migration probability information comprising an access point assignment probability for each bin.

18. The RAN device of claim 12, wherein the aggregate network resource usage is estimated based on the migration probability information and a resource usage for each bin as a function of neighbor access point load.

19. The RAN device of claim 12, wherein the aggregate network resource usage is estimated based on the migration probability information related to mobile stations in the access point and adjacent access points and a current network load.

20. A computer program product configured for implementation in a radio access network (RAN) device, the computer program product comprising a non-transitory computer readable storage medium storing programming, the programming including instructions to:
    receive a migration probability table from a network component in a core network, the migration probability table specifying probabilities that mobile stations having certain mobility parameters will migrate from a first bin to a second bin of multiple bins served by an access point over one or more fixed time periods, the probabilities determined based on gathered bin-based statistical information for the access point;
    for each mobile station currently located in one bin of the multiple bins served by the access point:
      obtain at least one current mobility parameter for the each mobile station:
      estimate migration probability information for the each mobile station based on the at least one current mobility parameter for the each mobile station and the migration probability table;

estimate an aggregate network resource usage of the access point during a future period based on the estimated migration information of all the mobile stations currently located in one bin of the multiple bins served by the access point; and admit one or more new user sessions in the first bin based on the estimated aggregate network resource usage.

21. The computer program product of claim 20, wherein the aggregate network resource usage is estimated based on the migration probability information comprising assignment probability for each bin.

22. The computer program product of claim 20, wherein the aggregate network resource usage is estimated based on the migration probability information and a resource usage for each bin as a function of neighbor access point load.

* * * * *

UNITED STATES PATENT AND TRADEMARK OFFICE
CERTIFICATE OF CORRECTION

PATENT NO. : 10,159,022 B2
APPLICATION NO. : 15/208471
DATED : December 18, 2018
INVENTOR(S) : Nimal Gamini Senarath et al.

It is certified that error appears in the above-identified patent and that said Letters Patent is hereby corrected as shown below:

In the Claims

In Column 23, Line 62, Claim 12, delete "the migration probability table:" and insert --the migration probability table;--.

In Column 24, Line 63, Claim 20, delete "each mobile station:" and insert --each mobile station;--.

Signed and Sealed this
Twenty-sixth Day of February, 2019

Andrei Iancu
*Director of the United States Patent and Trademark Office*